(12) United States Patent
Li et al.

(10) Patent No.: US 11,394,950 B2
(45) Date of Patent: Jul. 19, 2022

(54) AUGMENTED REALITY-BASED REMOTE GUIDANCE METHOD AND APPARATUS, TERMINAL, AND STORAGE MEDIUM

(71) Applicant: HISCENE INFORMATION TECHNOLOGY CO., LTD, Shanghai (CN)

(72) Inventors: Peiyi Li, Shanghai (CN); Xiangnan Zhou, Shanghai (CN)

(*) Notice: Subject to any disclaimer, the term of this patent is extended or adjusted under 35 U.S.C. 154(b) by 0 days.

(21) Appl. No.: 17/126,015

(22) Filed: Dec. 17, 2020

(65) Prior Publication Data
US 2021/0120221 A1    Apr. 22, 2021

Related U.S. Application Data

(63) Continuation of application No. PCT/CN2018/121728, filed on Dec. 18, 2018.

(30) Foreign Application Priority Data

Jun. 19, 2018 (CN) .......................... 201810628312.5

(51) Int. Cl.
*H04N 13/207* (2018.01)
*G06T 7/73* (2017.01)
(Continued)

(52) U.S. Cl.
CPC ............. *H04N 13/207* (2018.05); *G06T 7/75* (2017.01); *H04N 13/111* (2018.05);
(Continued)

(58) Field of Classification Search
CPC .. H04N 13/207; H04N 13/344; H04N 13/111; H04N 2213/008; G06T 7/75; G06T 2207/10028; G06T 2207/30244
See application file for complete search history.

(56) References Cited

U.S. PATENT DOCUMENTS

2014/0300775 A1* 10/2014 Fan ..................... H04N 1/32128
348/231.3
2015/0213648 A1* 7/2015 Wu ....................... H04N 13/275
345/419
(Continued)

FOREIGN PATENT DOCUMENTS

CN         1920886 A   *   2/2007
CN         1920886 A       2/2007
(Continued)

OTHER PUBLICATIONS

Long Chen, "SLAM-based dense surface reconstruction in monocular Minimally Invasive Surgery and its application to Augmented Reality", Feb. 2018, "Computer Methods and Programs in Biomedicine", pp. 135-146. (Year: 2018).*

*Primary Examiner* — Terrell M Robinson
(74) *Attorney, Agent, or Firm* — Kilpatrick Townsend & Stockton, LLP

(57) ABSTRACT

Embodiments disclose an augmented reality-based remote guidance method and apparatus, terminal, and storage medium. The method comprises the following steps: acquiring a two-dimensional video of a target scene, and sending the two-dimensional video to a remote terminal; if a guidance mode of the remote guidance is marking mode, acquiring two-dimensional pixel coordinates corresponding to a marked point in a marked image frame of the two-dimensional video at the remote terminal; determining current camera coordinates corresponding to the marked point, according to first three-dimensional coordinate estimation rules and the two-dimensional pixel coordinates, wherein the current camera coordinates are current three-dimensional space coordinates corresponding to the marked point in a camera coordinate system; and according to a presentation mode and the current camera coordinates rendering a (Continued)

three-dimensional virtual model corresponding to the marked point so as to display the three-dimensional virtual model in the target scene.

18 Claims, 6 Drawing Sheets

(51) Int. Cl.
*H04N 13/344* (2018.01)
*H04N 13/111* (2018.01)

(52) U.S. Cl.
CPC . *H04N 13/344* (2018.05); *G06T 2207/10028* (2013.01); *G06T 2207/30244* (2013.01); *H04N 2213/008* (2013.01)

(56) References Cited

U.S. PATENT DOCUMENTS

2016/0012643 A1\* 1/2016 Kezele ............... G02B 27/0093
  345/633
2016/0335774 A1  11/2016 Hsieh et al.
2018/0033209 A1\*  2/2018 Akeley ................ H04N 13/106

FOREIGN PATENT DOCUMENTS

| CN | 101686407 A |   | 3/2010 |   |
|----|----|----|----|----|
| CN | 102129708 A | \* | 7/2011 |   |
| CN | 102129708 A |   | 7/2011 |   |
| CN | 102831401 A |   | 12/2012 |   |
| CN | 108805979 A | \* | 11/2018 | ............. G06T 17/00 |
| CN | 108830894 A |   | 11/2018 |   |

\* cited by examiner

AUGMENTED REALITY-BASED REMOTE GUIDANCE METHOD AND APPARATUS, TERMINAL, AND STORAGE MEDIUM

CROSS-REFERENCES TO RELATED APPLICATIONS

This application is a continuation of PCT/CN2018/121728 filed 2018 Dec. 18, which claims priority to CN 201810628312.5 filed 2018 Jun. 19, both of which are incorporated herein by reference.

FIELD

The present disclosure relates to a computer vision technology, in particular to an augmented reality-based remote guidance method and apparatus, terminal, and storage medium.

BACKGROUND

In the field of computer vision research, Augmented Reality (AR) can enable intelligent devices to understand the scene where the intelligent devices are located, and render objects which do not exist in the real scene, so that users can acquire more accurate information from the real scene, or a better entertainment experience. In the remote guidance based on augmented reality, the three-dimensional virtual model corresponding to the marked point on a certain two-dimensional image frame by the instructor at the remote terminal needs to be rendered, so that the operator at the field terminal can see the three-dimensional virtual model, which is convenient for accurate operation.

Generally, there are two ways of remote guidance. The first way is the plane-to-plane interaction way, which comprises the following steps: a field terminal sends a two-dimensional video captured by a camera to a remote terminal, an instructor at the remote terminal marks a certain two-dimensional image frame, then conveys this two-dimensional image frame to an operator at the field terminal, and the operator understands the meaning of the mark of the instructor by looking over the image frame. The second way is as follows: two different sensors, RGB (Red Green blue) camera and depth camera, are installed on the field terminal to simultaneously acquire two-dimensional images and depth images, but only the two-dimensional images are transmitted to the instructor at the remote terminal, and the instructor at the remote terminal marks the two-dimensional images and then transmits the two-dimensional images to the operator at the field terminal. According to the acquired depth images, calculating the depth pixel coordinates in the depth images corresponding to the two-dimensional pixel coordinates marked by the remote terminal instructor, and then acquiring depth information from the depth pixel coordinates, thereby obtaining the three-dimensional space coordinates corresponding to the marked points, the marked points can be rendered in the real reality scene by augmented reality glasses at the field terminal through the binocular OST (Optical See-Through, optical lens) lens.

However, corresponding to the first remote guidance way, the field operator can only speculate the meaning of the mark of the instructor at the remote terminal by viewing the image, which makes the guidance not intuitive enough. Corresponding to the second remote guidance way, a depth camera needs to be added on the field terminal, which greatly increases the cost of hardware. In addition, when the operator at the field terminal wants to observe the marked points from another angle, the marked points will be marked in the wrong position due to the absence of the tracking algorithm in this way, so that the operator at the field terminal needs to completely keep that the worn augmented reality glasses do not move spatially within the marking time. It can be seen that the practical limitations of this remote guidance way are large.

It can be seen that a technical scheme is urgently needed at present which can track in real-time and render the three-dimensional virtual model corresponding to the marked points by using only one normal RGB camera.

SUMMARY

The embodiment of the disclosure provides an augmented reality-based remote guidance method and apparatus, terminal, and storage medium, in order to track in real-time and render the marked points, so as to improve the accuracy and the efficiency of the remote guidance.

In the first aspect, the embodiment of the present disclosure provides an augmented reality-based remote guidance method, comprising:

acquiring a two-dimensional video of a target scene, and sending the two-dimensional video to a remote terminal;

if a guidance mode of remote guidance is the marking mode, acquiring two-dimensional pixel coordinates corresponding to a marked point in a marked image frame of the two-dimensional video at the remote terminal;

determining current camera coordinates corresponding to the marked point, according to first three-dimensional coordinate estimation rules and the two-dimensional pixel coordinates, wherein the current camera coordinates are current three-dimensional space coordinates corresponding to the marked point in a camera coordinate system; and rendering a three-dimensional virtual model corresponding to the marked point according to a presentation mode and the current camera coordinates to display the three-dimensional virtual model in the target scene.

In the second aspect, the embodiment of the present disclosure further provides an augmented reality-based remote guidance apparatus, comprising:

a two-dimensional video acquisition module is used for acquiring a two-dimensional video of a target scene and sending the two-dimensional video to a remote terminal;

a two-dimensional pixel coordinates acquisition module is used for acquiring two-dimensional pixel coordinates corresponding to a marked point in a marked image frame of the two-dimensional video at the remote terminal, if the guidance mode of remote guidance is the marking mode;

current camera coordinates determination module is used for determining current camera coordinates corresponding to the marked point according to first three-dimensional coordinate estimation rules and the two-dimensional pixel coordinates, wherein the current camera coordinates are current three-dimensional space coordinates corresponding to the marked point in a camera coordinate system; and a three-dimensional virtual model rendering module is used for rendering a three-dimensional virtual model corresponding to the marked point according to a presentation mode and the current camera coordinates to display the three-dimensional virtual model in the target scene.

In the third aspect, the embodiment of the present disclosure further provides a terminal, the terminal comprises:

one or more processors;
a storage apparatus for storing one or more programs;
an input apparatus for acquiring a two-dimensional video an output apparatus for displaying a three-dimensional virtual model corresponding to a marked point;

while the one or more programs are executed by the one or more processors, the one or more processors are configured to implement the augmented reality-based remote guidance method according to any embodiment of the disclosure.

In the fourth aspect, the embodiment of the present disclosure further provides a non-transitory computer-readable storage medium including computer code, when the computer code is executed by a processor, performs the augmented reality-based remote guidance method according to any embodiment of the present disclosure.

The embodiment of the present disclosure sends an acquired two-dimensional video of a target scene to a remote terminal; when a guidance mode of remote guidance is the marking mode, acquiring two-dimensional pixel coordinates corresponding to a marked point in a marked image frame of the two-dimensional video at the remote terminal; determining current camera coordinates corresponding to the marked points according to first three-dimensional coordinate estimation rules and the two-dimensional pixel coordinates; and rendering a three-dimensional virtual model corresponding to the marked points according to a presentation mode and the current camera coordinates to display the three-dimensional virtual model in the target scene. In this embodiment, only one normal RGB camera can be used to take the two-dimensional video, and the depth camera is not required to be added to obtain a depth image, so that the hardware cost is reduced. And the current camera coordinates corresponding to the marked points can be determined in real-time, so that the three-dimensional virtual model corresponding to the marked points can be tracked and rendered in real-time according to the current camera coordinates, and the three-dimensional virtual model corresponding to the marked points can be marked at an accurate position when the operator at the field terminal observes at any angle, thereby greatly improving the accuracy and the guidance efficiency of remote guidance.

DETAILED DESCRIPTION OF THE INVENTION

Figure 1:
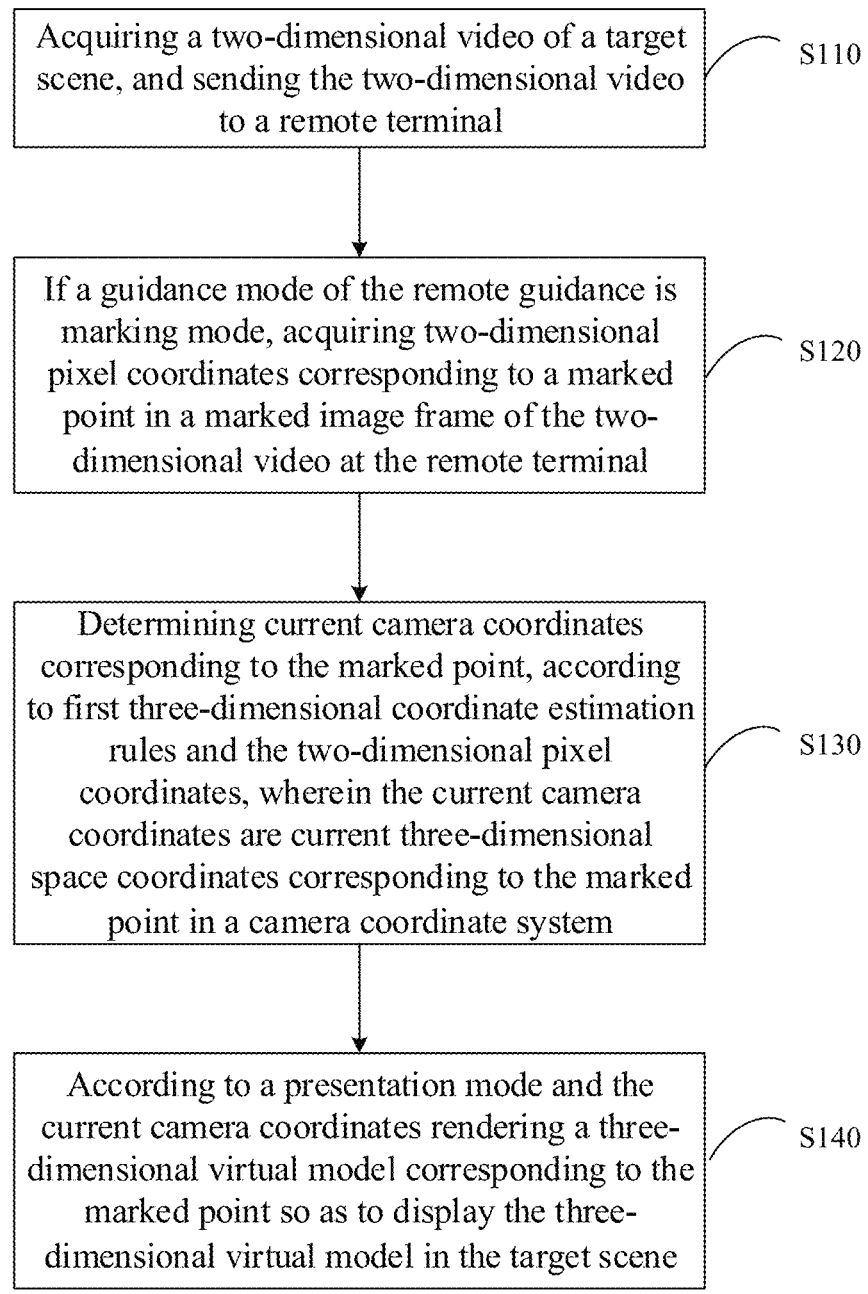
FIG. 1 shows a flowchart of an augmented reality-based remote guidance method according to Embodiment One of the present disclosure.

Hereinafter, the present disclosure will be further described in detail with reference to the accompanying drawings. It can be understood that the embodiments described herein are only for the purpose of explaining the disclosure and not for the limitation of the disclosure. In addition, it should be further noted that, for the convenience of description, only parts but not all structures related to the present disclosure are shown in the drawings Embodiment One FIG. 1 shows a flowchart of an augmented reality-based remote guidance method according to Embodiment One of the present disclosure, where the method is applied to a field terminal. The embodiment can be applied to a condition of tracking in real-time and rendering a three-dimensional virtual model corresponding to a marked point in a two-dimensional video at a remote terminal. The method may be executed by an augmented reality-based remote guidance apparatus, which may be implemented by software and/or hardware, integrated in the field terminal with the RGB camera, such as smart phone, tablet computer, AR glasses, MR (mixed Reality) glasses, VR (Virtual Reality) glasses with camera, and the like. The method comprises the following steps:

S110, acquiring a two-dimensional video of a target scene, and sending the two-dimensional video to a remote terminal.

Wherein, the target scene refers to a real scene where a target object is located, and the target object needs the guidance of an instructor at the remote terminal. The remote terminal refers to an intelligent terminal used by the remote instructor, such as a smart phone, tablet computer, laptop and the like. In this embodiment, a field operator may use a normal RGB camera on the field terminal to acquire the two-dimensional video of the target scene, and the field terminal sends the acquired two-dimensional video to the remote terminal, so that the remote instructor may intuitively observe the situation of the field operator in real-time, and perform technical guidance on the field operator according to the two-dimensional video of the target scene. Each image frame in the two-dimensional video does not contain depth information of the object. The two-dimensional video in this embodiment can refer to the video in a static scene captured by a moving monocular camera.

S120, if a guidance mode of remote guidance is marking mode, acquiring two-dimensional pixel coordinates corresponding to a marked point in a marked image frame of the two-dimensional video at the remote terminal.

Wherein, the guidance mode of remote guidance can include but not limited to marking mode, audio mode, text annotation mode, and the like. The guidance mode of remote guidance is marking mode, if the remote instructor selects a point to mark on an object in a certain image frame in the two-dimensional video sent by the field terminal. In some embodiments, the remote instructor may select the marked point on any image frame in the two-dimensional video by mouse click or touch on a touch screen, and may also determine any position in the image frame as the marked point, the marked point may be on a plane or in a floating state. The marked image frame refers to the image frame where the marked point is located. For example, if the image content of the marked image frame is a desktop including a water cup, the marked point may be a point on the plane of the desktop, or the tip of the handle of a water cup placed on the desktop. The number of the marked point in the marked image frame may be one or more. When there are multiple marked points, the remote guidance method provided by the embodiment may be used to render the three-dimensional virtual model corresponding to each marked point one by one. On the image plane, the vertex at the upper left corner of the image plane may be determined as the origin of the pixel coordinate system, and a horizontal line and a vertical line may be determined as a u-axis and a v-axis, respectively, to establish the pixel coordinate system o-uv. The two-dimensional pixel coordinate corresponding to the marked point refers to the pixel coordinate corresponding to the marked point in the pixel coordinate system. After the remote instructor selects the marked point on the remote terminal, the remote terminal sends the two-dimensional pixel coordinate corresponding to the marked point to the field terminal.

S130, determining current camera coordinates corresponding to the marked point, according to first three-dimensional coordinate estimation rules and the two-dimensional pixel coordinates, wherein the current camera coordinates are current three-dimensional space coordinates corresponding to the marked point in a camera coordinate system.

Wherein, the first three-dimensional coordinate estimation rules may be rules for estimating current three-dimensional space coordinates corresponding to the marked point in the camera coordinate system according to the two-dimensional pixel coordinates corresponding to the marked point, and may be preset according to actual conditions and requirements. In space, the camera optical center may be determined as the origin of a camera coordinate system, establishing the camera coordinate system $O_C$-$X_C Y_C Z_C$. When the field operator moves the camera to change an observation angle, the camera coordinates corresponding to the marked point will also change in the camera coordinate system. In this embodiment, the current camera coordinates corresponding to the marked point at the current moment is determined in real-time, so that the camera three-dimensional space coordinates corresponding to the marked point can be tracked in real-time to locate the three-dimensional virtual model of the marked point in real-time.

In some embodiments, S130 comprises: determining world coordinates corresponding to the marked point according to second three-dimensional estimation rules, the preset reconstruction algorithm and the two-dimensional pixel coordinates, wherein the world coordinates refer to world three-dimensional space coordinates corresponding to the marked point in a world coordinate system; determining a current camera pose according to the preset reconstruction algorithm and the two-dimensional video; and determining current camera coordinates corresponding to the marked point according to the world coordinates and the current camera pose.

Wherein, the second three-dimensional estimation rules can be used to determine the world three-dimensional space coordinates corresponding to the marked point in the world coordinate system. The world coordinate system $O_w$-$X_w Y_w Z_w$ may be used to describe the spatial location of cameras and objects in the real scene. When the field operator moves a camera to change the observation angle, that is, when a camera pose changes, camera coordinates corresponding to the marked point change along with the change of the camera pose, while world coordinates corresponding to the marked point remain unchanged along with the change of the camera pose, so that the world coordinates corresponding to the marked point need to be determined according to the second three-dimensional estimation rule. The preset reconstruction algorithm may be an algorithm for creating the three-dimensional world point cloud and determining the current camera pose, where the three-dimensional world point cloud is the three-dimensional point cloud in the world coordinate system. The preset reconstruction algorithm may include, but is not limited to, the three-dimensional reconstruction algorithm, which is typically used to create dense three-dimensional point clouds, and the Simultaneous Localization And Mapping (SLAM) algorithm, which is typically used to create sparse three-dimensional point clouds. In an exemplary case, when the SLAM algorithm is used in the robot field, the robot starts to move from an unknown location in an unknown scene, a map of the entire environment is constructed through data collected by a sensor (generally, a camera) during movement, and spatial positioning and attitude of the robot in the scene are derived. The three-dimensional reconstruction algorithm may include, but is not limited to, the SFM (Structure From Motion) algorithm. SLAM algorithms may include, but are not limited to, ORB (Oriented FAST and Rotated BRIEF) SLAM algorithms, SIFT (Scale-Invariant Feature Transform) SLAM algorithms, SURF (Speedup Up Robust Features) SLAM algorithms, VINS-SLAM algorithms, and other SLAM algorithms with IMU (Inertial measurement unit) optimization. When the three-dimensional point cloud is created according to the preset reconstruction algorithm, the position and the posture of the camera corresponding to each image frame in the two-dimensional video can be calculated in real-time. The position and the posture of the camera corresponding to each image frame can change in real-time along with the movement of the camera. The camera pose may include spatial coordinates of the camera in the world coordinate system and which direction does the camera face, namely the camera pose is used to represent the transformation relationship between the camera coordinate system and the world coordinate system. The current camera pose refers to the camera pose corresponding to the current image frame acquired at the current moment, namely the transformation relationship between the camera coordinate system and the world coordinate system at the current moment. According to the current camera pose, the world coordinates corresponding to the marked point can be converted into the current camera coordinate system, in order to obtain the current camera coordinates corresponding to the marked point.

In some embodiments, determining world coordinates corresponding to the marked point according to second three-dimensional estimation rules, the preset reconstruction algorithm and the two-dimensional pixel coordinates, comprises: determining first mapping straight line corresponding to the two-dimensional pixel coordinates in the camera coordinate system according to the fifth transformation relationship between the pixel coordinate system and the camera coordinate system; determining the target camera point in the camera coordinate system according to a sixth transformation relationship between the world coordinate system and the camera coordinate system, preset filtering rules, and a three-dimensional world point cloud in the world coordinate system, wherein the three-dimensional world point cloud and the sixth transformation relationship are determined according to the two-dimensional video and the preset reconstruction algorithm; determining camera coordinates corresponding to the marked point in the camera coordinate system according to third estimation rules corresponding to the preset filtering rules, the first mapping straight line and the target camera point; and determining world coordinates corresponding to the marked point in the world coordinate system according to the sixth transformation relationship and the camera coordinates.

Wherein, the fifth transformation relationship between the pixel coordinate system and the camera coordinate system in this embodiment may include the first conversion matrix converted from the pixel coordinate system to the camera coordinate system and/or the second conversion matrix converted from the camera coordinate system to the pixel coordinate system, where the second conversion matrix may be an inverse matrix of the first conversion matrix. The fifth transformation relationship is an intrinsic matrix of the camera, and may be predetermined according to the model and type of the camera. When two-dimensional pixel coordinates in the pixel coordinate system are converted to three-dimensional coordinates in the camera coordinate system, that is, when mapping from a low dimension to a high dimension, the first mapping straight line corresponding to the two-dimensional pixel coordinates in the camera coordinate system, that is, the first mapping straight line corresponding to the marked point in the camera coordinate system, may be determined according to the dimension mapping principle and the fifth transformation relationship between the pixel coordinate system and the camera coordinate system.

The sixth transformation relationship between the world coordinate system and the camera coordinate system in the present embodiment refers to the transformation relationship between the world coordinate system and the camera coordinate system at the time of capturing the marked image frame. The sixth transformation relationship may be represented by the rotation matrix and the translation vector, wherein the rotation matrix may represent the pointing direction of the camera in the world coordinate system, and the translation vector may represent the position of the camera in the world coordinate system. The sixth transformation relationship may include the transformation relationship from the world coordinate system to the camera coordinate system and/or the transformation relationship from the camera coordinate system to the world coordinate system. The three-dimensional world point cloud in this embodiment refers to the three-dimensional point cloud in the world coordinate system. The target camera point refers to the three-dimensional target point in the camera coordinate system. The preset filtering rules may refer to a rule for determining the target camera point from the point cloud. The number of the target camera points may be one or more, and may be determined according to the preset filtering rule.

The third estimation rules may refer to rules for estimating depth information of the marked point. The third estimation rules corresponds to the preset filtering rules for determining the target camera point. For example, if only one target camera point is determined by the preset filtering rules, the third estimation rules corresponding to the preset filtering rules may be rules for determining the target depth information according to the target camera point. If a plurality of target camera points are determined by the preset filtering rules, the third estimation rules corresponding to the preset filtering rules may be rules for determining the target depth information according to the plurality of target camera points. The camera coordinates in the present embodiment refer to three-dimensional space coordinates corresponding to the marked point in the camera coordinate system when the marked image frame is captured. The camera coordinates corresponding to the marked point are determined according to the first mapping straight line and the target camera points in the camera coordinate system based on the third estimation rules, and the three-dimensional space coordinates of the marked point do not need to fall on a forcibly fitted plane, so that the accuracy of three-dimensional space coordinate estimation is greatly improved. And mapping the camera coordinate corresponding to the marked point to the world coordinate system according to the sixth transformation relationship between the camera coordinate system and the world coordinate system when the marked image frame is captured, so that the world coordinate corresponding to the marked point in the world coordinate system can be determined, and the world coordinate corresponding to the determined marked point is kept unchanged along with the movement of the camera.

In some embodiments, the preset reconstruction algorithm comprises SLAM algorithm based on ORB feature points;

wherein the three-dimensional world point cloud is determined according to the two-dimensional video and the preset reconstruction algorithm, comprises: extracting ORB feature points of the current image frame and ORB feature points of the previous image frame of the current image frame in the two-dimensional video; and matching the ORB feature points of the current image frame with the ORB feature points of the previous image frame, and creating the three-dimensional world point cloud of the ORB feature points according to the parallax principle.

Figure 2:
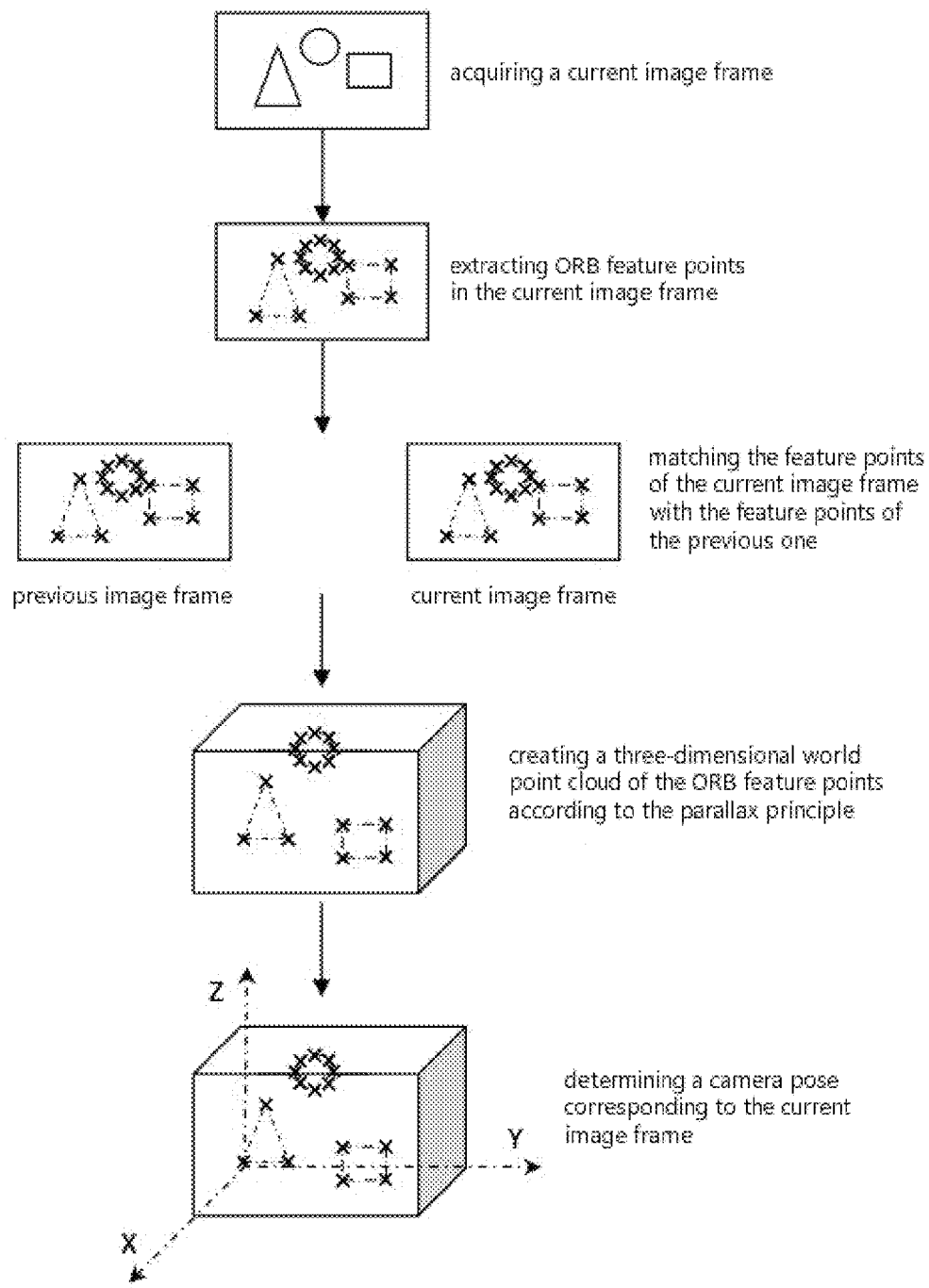
FIG. 2 shows a flowchart of a simultaneous localization and mapping (SLAM) algorithm based on ORB feature points according to Embodiment One of the present disclosure.

Wherein, ORB is a fast and stable local feature extractor, which can be used for object recognition, three-dimensional reconstruction, etc, in the field of computer vision. The current image frame in this embodiment may refer to the image frame captured at the current time in the two-dimensional video, and the previous image frame may refer to the image frame that is previous to the current image frame in the image frame sequence of the two-dimensional video. FIG. 2 shows a flowchart of a SLAM algorithm based on ORB feature points. As shown in FIG. 2, the content of the current image frame is a circle, a triangle and a rectangle, and the ORB feature points in the current image frame are matched with the ORB feature points in the previous image frame by extracting the ORB feature points (labeled as x in FIG. 2) in the current image frame. The parallax principle means that when the camera moves in space, the moving distances of points at different depths from the camera in the two-dimensional image frame captured by the camera are different, so that the distance relationship between this points and the camera can be calculated. As shown in FIG. 2, the image frame taken at the next moment is used as the current image frame to perform feature point matching circularly, so that the three-dimensional world point cloud in the world coordinate system can be created according to the parallax principle.

In some embodiments, the sixth transformation relationship is determined according to the two-dimensional video and the preset reconstruction algorithm, comprises: determining the marked camera pose corresponding to the marked image frame according to the ORB feature points in the marked image frame and the ORB feature points in the previous image frame of the marked image frame, and taking the marked camera pose as the sixth transformation relationship.

As shown in FIG. 2, the camera pose corresponding to each image frame in the two-dimensional video can be calculated in real-time, when the three-dimensional world point cloud is created by the SLAM algorithm based on ORB feature points. The embodiment can determine the camera pose corresponding to the moment when the marked image frame is captured by the ORB feature points of the marked image frame and the ORB feature points of the previous image frame of the marked image frame. According to the camera pose corresponding to the time of the marked image frame the sixth transformation relationship between the camera coordinate system and the world coordinate system can be directly obtained when the marked image frame is captured, namely the camera pose corresponding to the time of the marked image frame can be directly determined as the sixth transformation relationship.

In some embodiments, the preset reconstruction algorithm comprises SLAM algorithm based on ORB feature points; wherein determining the current camera pose according to the preset reconstruction algorithm and the two-dimensional video, comprises: determining the current camera pose according to ORB feature points in the current image frame of the two-dimensional video and ORB feature points in the previous image frame of the current image frame.

As shown in FIG. 2, the camera pose corresponding to each image frame in the two-dimensional video can be calculated in real-time, when the three-dimensional world point cloud is created by the SLAM algorithm based on the ORB feature points.

In this embodiment, after the field terminal acquires the two-dimensional video of the target scene, the acquired two-dimensional video is sent to the remote terminal, so that the remote terminal can view the field situation in real-time and mark the image frame in the two-dimensional video, and meanwhile, the field terminal creates the three-dimensional world point cloud according to the acquired two-dimensional video and the preset reconstruction algorithm and determines the camera pose corresponding to each image frame in the two-dimensional video.

In some embodiments, determining the target camera point in the camera coordinate system according to the sixth transformation relationship between the world coordinate system and the camera coordinate system, the preset filtering rules, and the three-dimensional world point cloud in the world coordinate system, comprises: determining a three-dimensional camera point cloud in the camera coordinate system according to the sixth transformation relationship between the world coordinate system and the camera coordinate system, and further according to the three-dimensional world point cloud in the world coordinate system; and determining the target camera point in the camera coordinate system according to the preset filtering rules, the three-dimensional camera point cloud and the first mapping straight line corresponding to the two-dimensional pixel coordinates.

Wherein, the three-dimensional camera point cloud refers to the three-dimensional point cloud in the camera coordinate system. According to the sixth transformation relationship between the world coordinate system and the camera coordinate system, the three-dimensional world point cloud in the world coordinate system can be mapped to the camera coordinate system, so that the three-dimensional camera point cloud in the camera coordinate system can be obtained. The preset filtering rules may be the rules for determining the target camera point from the three-dimensional camera point cloud. The first mapping straight line is a mapping straight line corresponding to two-dimensional pixel coordinates in the camera coordinate system. The target camera point can be one or more, and is determined by the preset filtering rules. For example, the preset filtering rules may be, but are not limited to, filtering according to the vertical distance between each point in the three-dimensional camera point cloud and the first mapping straight line.

In some embodiments, determining the target camera point in the camera coordinate system according to the sixth transformation relationship between the world coordinate system and the camera coordinate system, the preset filtering rules, and the three-dimensional world point cloud in the world coordinate system, comprises: mapping the two-dimensional pixel coordinates into the three-dimensional world point cloud in the world coordinate system, and determining a second mapping straight line corresponding to the two-dimensional pixel coordinates in the world coordinate system; determining a target world point in the three-dimensional world point cloud according to the preset filtering rules and the second mapping straight line; and determining the target camera point in the camera coordinate system according to the sixth transformation relationship between the world coordinate system and the camera coordinate system, and further according to the target world point.

Wherein, when the two-dimensional pixel coordinates are mapped to the three-dimensional world point cloud in the world coordinate system, that is, when mapping from a low dimension to a high dimension, the second mapping straight line corresponding to the two-dimensional pixel coordinates in the world coordinate system can be determined according to the fifth transformation relationship between the pixel coordinate system and the camera coordinate system and the sixth transformation relationship between the world coordinate system and the camera coordinate system. The target world point refers to the three-dimensional target point in the world coordinate system. The preset filtering rules may refer to the rules for determining the target world point from the three-dimensional world point cloud. The target world point can be one or more, and is determined by the preset filtering rules. For example, the preset filtering rules may be, but are not limited to, filtering according to the vertical distance between each point in the three-dimensional world point cloud and the second mapping straight line. And converting each determined target world point to the camera coordinate system according to the sixth transformation relationship between the world coordinate system and the camera coordinate system, so as to obtain the target camera point in the camera coordinate system.

In some embodiments, determining the target camera point in the camera coordinate system according to the sixth transformation relationship between the world coordinate system and the camera coordinate system, the preset filtering rules, and the three-dimensional world point cloud in the world coordinate system, comprises: determining the three-dimensional camera point cloud in the camera coordinate system according to the three-dimensional world point cloud in the world coordinate system, and the sixth transformation relationship between the world coordinate system and the camera coordinate system; determining the two-dimensional pixel point cloud in the pixel coordinate system according to the three-dimensional camera point cloud, and the fifth transformation relationship between the pixel coordinate system and the camera coordinate system, and recording the mapping between the three-dimensional camera point and the two-dimensional pixel point; determining the target pixel point in the two-dimensional pixel point cloud according to the preset filtering rules, the two-dimensional pixel point cloud and the two-dimensional pixel coordinates; and determining the target camera point in the camera coordinate system according to the mapping and the target pixel point.

Wherein, the three-dimensional camera point cloud refers to the three-dimensional point cloud in the camera coordinate system. The two-dimensional pixel point cloud refers to the two-dimensional point cloud in the pixel coordinate system. And according to the sixth transformation relationship between the world coordinate system and the camera coordinate system, mapping each point in the three-dimensional world point cloud in the world coordinate system to the camera coordinate system, so that the three-dimensional camera point cloud in the camera coordinate system can be determined. And according to the fifth transformation relationship between the pixel coordinate system and the camera coordinate system, the three-dimensional camera point cloud under the camera coordinate system is projected to the pixel coordinate system by dimensionality reduction, so that the two-dimensional pixel point cloud in the pixel coordinate system can be determined. In the process of the dimensionality reduction projection, the mapping between each three-dimensional camera point in the three-dimensional camera point cloud and the projected two-dimensional pixel point is recorded. The mapping may be a corresponding relationship between the three-dimensional space coordinate of each three-dimensional camera point and the pixel coordinate of each two-dimensional pixel point, or may be a corresponding relationship between the $Z_C$ value in the three-dimensional space coordinate of each three-dimensional camera point and the pixel coordinate of each two-dimensional pixel point. The preset filtering rules may be rules for determining the target pixel point from the two-dimensional pixel point cloud. One or more target pixel points can be determined by the preset filtering rules. For example, the preset filtering rules may be, but are not limited to, filtering according to the distance between each point in the two-dimensional pixel point cloud and the two-dimensional pixel coordinate. And matching in the corresponding relationship according to the pixel coordinates of the target pixel points, and determining the three-dimensional camera points corresponding to the pixel coordinates of the target pixel points as target camera points.

It can be seen that, in this embodiment, the target camera point may be directly determined in the three-dimensional camera point cloud, the target world point may also be determined in the three-dimensional world point cloud, and then the target camera point corresponding to the target world point is determined, and also the target pixel point may be determined in the two-dimensional pixel point cloud, and then the target camera point corresponding to the target pixel point is determined.

In some embodiments, Determining camera coordinates corresponding to the marked point in the camera coordinate system according to third estimation rules corresponding to the preset filtering rules, the first mapping straight line and the target camera point, comprises: determining the target depth value according to the third estimation rules corresponding to the preset filtering rules and the target camera point; and determining the target estimation point corresponding to the target depth value on the first mapping straight line, and determining the three-dimensional space coordinates corresponding to the target estimation point as the camera coordinates corresponding to the marked point.

Wherein, the target depth value refers to the depth information of the marked point, so this embodiment does not need to use a depth camera to obtain the depth information of the marked point. The first mapping straight line in this embodiment is the mapping straight line corresponding to the marked point in the camera coordinate system, so that it is indicated that the camera three-dimensional space coordinate corresponding to the marked point is the three-dimensional space coordinate of a certain point on the first mapping straight line. In this embodiment, according to the target depth value, the point where the $Z_C$ value on the first mapping straight line is the target depth value is determined as the target estimation point corresponding to the target depth value, and the three-dimensional space coordinate of the target estimation point in the camera coordinate system is directly determined as the camera coordinate corresponding to the marked point. Because the $Z_C$ value in the three-dimensional space coordinate corresponding to each target camera point can accurately represent the depth value of the target camera point in the camera coordinate system, the target depth value corresponding to the marked point can be accurately determined, and the estimation of the camera coordinate corresponding to the marked point is more accurate.

For the method of directly determining the target camera point in the three-dimensional camera point cloud, In some embodiments, determining the target camera point in the camera coordinate system according to the preset filtering rule, the three-dimensional camera point cloud and the first mapping straight line corresponding to the two-dimensional pixel coordinates, comprises: calculating the first vertical distance between each point in the three-dimensional camera point cloud and the first mapping straight line corresponding to the two-dimensional pixel coordinates, and determining the point with the minimum first vertical distance as the target camera point in the camera coordinate system; correspondingly, the determining the target depth value according to the third estimation rules corresponding to the preset filtering rules and the target camera point comprises: acquiring the depth value of the target camera point, and determining the depth value of the target camera point as the target depth value.

Wherein, the preset filtering rules can be to determine a point closest to the first mapping straight line as the target camera point in the three-dimensional camera point cloud, and at this time, there is only one target camera point. The $Z_C$ value in the three-dimensional space coordinates corresponding to the target camera point may be directly determined as the target depth value. The calculation is simple and the estimation efficiency is improved, by directly determining the depth value corresponding to the target camera point as the target depth value.

For the method of directly determining the target camera point in the three-dimensional camera point cloud, In some embodiments, the method for determining the target camera point in the camera coordinate system according to the preset filtering rule, the three-dimensional camera point cloud and the first mapping straight line corresponding to the two-dimensional pixel coordinate, comprises: calculating the first vertical distance between each point in the three-dimensional camera point cloud and the first mapping straight line corresponding to the two-dimensional pixel coordinate, and determining a plurality of points of whose first vertical distance is smaller than the first preset distance as target camera points in the camera coordinate system; correspondingly, determining the target depth value according to the third estimation rules corresponding to the preset filtering rules and the target camera point comprises: determining the average depth value according to the depth value of each target camera point and the number of the target camera points, and determining the average depth value as the target depth value.

Wherein, the preset filtering rules may be that all points whose first vertical distance from the first mapping straight line is less than the first preset distance are determined as target camera points, and the number of the determined target camera points is multiple at this time. The first preset distance can be predetermined according to actual conditions and used for filtering the target camera points in the three-dimensional camera point cloud. By accumulating the $Z_C$ value in the three-dimensional space coordinates corresponding to each target camera point, and dividing the accumulation result by the number of target camera points, the result is determined as the average depth value, and the average depth value is determined as the target depth value. The accuracy of depth value estimation may be improved, by determining the average depth value of a plurality of target camera points as the target depth value.

In some embodiments, before determining the average depth value according to the depth value of each target camera point and the number of target camera points, further comprises: determining the weight value corresponding to each target camera point according to the first vertical distance between each target camera point and the first mapping straight line corresponding to the two-dimensional pixel coordinates; determining the product of the depth value of the target camera point and the corresponding weight value as the final depth value of the target camera point; correspondingly, determining the average depth value according to the depth value of each target camera point and the number of the target camera points comprises: determining the average depth value according to the final depth value of each target camera point and the number of the target camera points.

Wherein, when a plurality of target camera points are determined according to the preset filtering rule, before determining the average depth value, the first vertical distance between each target camera point and the first mapping straight line may be calculated according to the three-dimensional space coordinate corresponding to each target camera point, and the weight value corresponding to each target camera point may be determined according to the first vertical distance. In this embodiment, the smaller the first vertical distance corresponding to a certain target camera point is, the larger the weight value of the target camera point is, and the sum of the weight values corresponding to target camera point is equal to 1. The result obtained by multiplying the depth value of each target camera point and its corresponding weight value is determined as the final depth value of the target camera point. Correspondingly, the final depth value of each target camera point are added, and the added result is divided by the number of the target camera points, so that the average depth value is obtained, and then the average depth value is determined as the target depth value. The accuracy of the depth value estimation can be further improved by determining the target depth value in the weighted average method.

For the method of determining the target world point in the three-dimensional world point cloud and then determining the target camera point corresponding to the target world point, In some embodiments, determining the target world point in the three-dimensional world point cloud according to the preset filtering rules and the second mapping straight line, comprises: calculating the second vertical distance between each point in the three-dimensional world point cloud and the second mapping straight line, and determining the point with the minimum second vertical distance as the target world point in the three-dimensional world point cloud; correspondingly, determining the target depth value according to the third estimation rules corresponding to the preset filtering rules and the target camera point comprises:

acquiring the depth value of the target camera point, and determining the depth value of the target camera point as the target depth value.

Wherein, the preset filtering rules can be to determine the point closest to the second mapping line as the target world point in the three-dimensional world point cloud, and only one target world point is determined at the moment. In the three-dimensional world point cloud, according to the three-dimensional space coordinate of each three-dimensional world point, the second vertical distance between each point and the second mapping straight line is calculated, and the point with the minimum second vertical distance is determined as the target world point. Correspondingly, when only one target world point is determined according to the preset filtering rule, the target camera point is indicated to be only one, namely the target camera point corresponding to the target world point is determined according to the sixth transformation relationship between the world coordinate system and the camera coordinate system. And acquiring the $Z_C$ value in the three-dimensional space coordinate corresponding to the target camera point, and directly determining the $Z_C$ value of the target camera point as the target depth value. The calculation is simple and the estimation efficiency is improved, by directly determining the depth value corresponding to the determined target camera point as the target depth value.

For the method of determining the target world point in the three-dimensional world point cloud and then determining the target camera point corresponding to the target world point, In some embodiments, determining the target world point in the three-dimensional world point cloud according to the preset filtering rule and the second mapping straight line, comprises: calculating the second vertical distance between each point in the three-dimensional world point cloud and the second mapping straight line, and determining a plurality of points of which the second vertical distances are less than the second preset distance as target world point in the three-dimensional world point cloud; correspondingly, the determining the target depth value according to the third estimation rules corresponding to the preset filtering rules and the target camera point comprises: determining the average depth value according to the depth value of each target camera point and the number of the target camera points, and determining the average depth value as the target depth value.

Wherein, the preset filtering rules may be that all points whose second vertical distance from the second mapping straight line is less than the second preset distance are determined as target world points, and the number of the determined target world points is multiple at this time. The second preset distance can be predetermined according to actual conditions and used for filtering the target world points in the three-dimensional world point cloud. Correspondingly, when a plurality of target world points are determined according to the preset filtering rules, the target camera points are indicated to be multiple, namely, the target camera points corresponding to each target world point are determined according to the sixth transformation relationship between the world coordinate system and the camera coordinate system. The depth value of the target camera point refers to the $Z_C$ value in the three-dimensional space coordinates corresponding to the target camera point. The depth value of each target camera point is added, and a result obtained by dividing the added result by the number of target camera points is determined as an average depth value, and the average depth value is determined as a target depth value. The accuracy of the depth value estimation may be improved, by determining the average depth value of a plurality of target camera points as the target depth value.

In some embodiments, before determining the average depth value according to the depth value of each target camera point and the number of target camera points, further comprises: calculating the third vertical distance between each target camera point and the first mapping straight line corresponding to the two-dimensional pixel coordinates, and determining the weight value corresponding to each target camera point according to each third vertical distance; determining the product of the depth value of the target camera point and the corresponding weight value as the final depth value of the target camera point; correspondingly, determining the average depth value according to the depth value of each target camera point and the number of the target camera points comprises: determining the average depth value according to the final depth value of each target camera point and the number of the target camera points.

Wherein, when a plurality of target camera points are determined according to the preset filtering rules, before determining the average depth value, the third vertical distance between each target camera point and the first mapping straight line may be calculated according to the three-dimensional space coordinate corresponding to each target camera point is determined, and the weight value corresponding to each target camera point may be determined according to the third vertical distance. In this embodiment, the smaller the third vertical distance corresponding to a certain target camera point is, the larger the weight value of the target camera point is, and the sum of the weight values corresponding to target camera point is equal to 1. In this embodiment, when a certain point and a certain straight line are both mapped to different coordinate systems, the vertical distance between the certain point and the straight line is fixed and unchanged in the same coordinate system, so that the third vertical distance between the target camera point and the first mapping straight line is equal to the second vertical distance between the target world point and the second mapping straight line. In some embodiments, in this embodiment, the weight value of the target camera point corresponding to the target world point may also be directly determined according to the second vertical distance between the certain target world point and the second mapping straight line, and the smaller the second vertical distance is, the larger the weight value of the target camera point is. The result obtained by multiplying the depth value of each target camera point and its corresponding weight value is determined as the final depth value of the target camera point. Correspondingly, the final depth values of each target camera point are added, and the added result is divided by the number of the target camera points, so that the average depth value is obtained, and then the average depth value is determined as the target depth value. The accuracy of the depth value estimation can be further improved by determining the target depth value in the weighted average method.

For the method of determining the target pixel point in the two-dimensional pixel point cloud and then determining the target camera point corresponding to the target pixel point, In some embodiments, determining the target pixel in the two-dimensional pixel point cloud according to preset filtering rules, two-dimensional pixel point cloud and two-dimensional pixel coordinates, comprises: calculating the coordinate distance between each point in the two-dimensional pixel point cloud and the two-dimensional pixel coordinate, and determining the point with the minimum coordinate distance as the target pixel point in the two-dimensional pixel point cloud; correspondingly, determining the target depth value according to the third estimation rules corresponding to the preset filtering rules and the target camera point comprises: acquiring the depth value of the target camera point, and determining the depth value of the target camera point as the target depth value.

Wherein, the preset filtering rules can be that the point closest to the two-dimensional pixel coordinate is determined as the target pixel point in the two-dimensional pixel point cloud, and there is only one target pixel at this time. In the two-dimensional pixel point cloud, the coordinate distance between each two-dimensional pixel point and the two-dimensional pixel coordinate is calculated according to the pixel coordinate of each two-dimensional pixel point, and the point with the minimum coordinate distance is determined as the target pixel point. Correspondingly, when only one target pixel point is determined according to the preset filtering rules, it is indicated that only one target camera point is provided, that is, the target camera point corresponding to the target pixel point is determined according to the corresponding relationship between the three-dimensional camera point and the two-dimensional pixel point, the $Z_C$ value in the three-dimensional space coordinate corresponding to the target camera point is obtained according to the corresponding relationship, and the $Z_C$ value of the target camera point is determined as the target depth value. The calculation is simple and the estimation efficiency is improved, by directly determining the depth value corresponding to the target camera point as the target depth value.

For the method of determining the target pixel point in the two-dimensional pixel point cloud and then determining the target camera point corresponding to the target pixel point, In some embodiments, determining the target pixel in the two-dimensional pixel point cloud according to preset filtering rules, two-dimensional pixel point cloud and two-dimensional pixel coordinates, comprises: calculating the coordinate distance between each point in the two-dimensional pixel point cloud and the two-dimensional pixel coordinate, and determining a plurality of points with the coordinate distance smaller than the preset coordinate distance as target pixel points in the two-dimensional pixel point cloud; correspondingly, determining the target depth value according to the third estimation rules for corresponding to the preset filtering rules and the target camera point comprises: determining the average depth value according to the depth value of each target camera point and the number of the target camera points, and determining the average depth value as the target depth value.

Wherein, the preset filtering rules can be that points whose coordinate distance from the two-dimensional pixel coordinate is smaller than the preset coordinate distance are determined as target pixel points, and the number of the determined target pixel points is multiple at this time. The preset coordinate distance can be predetermined according to actual conditions and used for filtering target pixel points in the two-dimensional pixel point cloud. Correspondingly, when a plurality of target pixel points are determined according to the preset filtering rules, it indicates that there are multiple target camera points, namely, the target camera point corresponding to each target pixel point and the $Z_C$ value in the three-dimensional space coordinate corresponding to the target camera point are determined according to the corresponding relationship between the three-dimensional camera point and the two-dimensional pixel points. The depth value of each target camera point is added, and a result obtained by dividing the added result by the number of target camera points is determined as the average depth value, and the average depth value is determined as the target depth value. The accuracy of the depth value estimation may be improved, by determining the average depth value of a plurality of target camera points as the target depth value.

In some embodiments, before determining the average depth value according to the depth value of each target camera point and the number of target camera points, further comprises: calculating the third vertical distance between each target camera point and the first mapping straight line corresponding to the two-dimensional pixel coordinates, and determining the weight value corresponding to each target camera point according to each third vertical distance; determining the product of the depth value of the target camera point and the corresponding weight value as the final depth value of the target camera point; or determining the weight value corresponding to the target camera point corresponding to each target pixel point according to the coordinate distance between each target pixel point and the two-dimensional pixel coordinate; determining the product of the depth value of the target camera point and the corresponding weight value as the final depth value of the target camera point; correspondingly, determining the average depth value according to the depth value of each target camera point and the number of the target camera points comprises: determining the average depth value according to the final depth value of each target camera point and the number of the target camera points.

Wherein, when a plurality of target camera points are determined according to the preset filtering rules, before determining the average depth value, the third vertical distance between each target camera point and the first mapping straight line may be calculated according to the three-dimensional space coordinate corresponding to each target camera point is determined, and the weight value corresponding to each target camera point may be determined according to the third vertical distance. In this embodiment, the smaller the third vertical distance corresponding to a certain target camera point is, the larger the weight value of the target camera point is, and the sum of the weight values corresponding to target camera point is equal to 1. Or in this embodiment, the weight value corresponding to the target camera point corresponding to the target pixel point can also be determined directly according to the coordinate distance between each target pixel point and the two-dimensional pixel coordinates, and the smaller the coordinate distance is, the larger the weight value corresponding to the target camera point corresponding to the target pixel point is. The result obtained by multiplying the depth value of each target camera point and its corresponding weight value is determined as the final depth value of the target camera point. Correspondingly, the final depth values of each target camera point are added, and the added result is divided by the number of the target camera points, so that the average depth value is obtained, and then the average depth value is determined as the target depth value. The accuracy of the depth value estimation can be further improved by determining the target depth value in the weighted average method.

S140, rendering a three-dimensional virtual model corresponding to the marked point according to a presentation mode and the current camera coordinates, to display the three-dimensional virtual model in the target scene.

Wherein, the presentation way in this embodiment may refer to the mode of presenting the three-dimensional virtual model corresponding to the marked point. The presentation way may be, but is not limited to, a mode of binocular OST (Optical See Through) lens, a mode of binocular VST (Video See Through) lens, and a mode of monocular VST lens. The mode of binocular OST lens means that users can directly see the three-dimensional virtual model corresponding to the marked point rendered in the real scene by using binocular parallax; the mode of binocular VST lens means that both eyes of the user can see a virtual screen containing the three-dimensional virtual model corresponding to the marked point; the mode of monocular VST lens means that one eye of the user can see a virtual screen containing the three-dimensional virtual model corresponding to the marked point. The three-dimensional virtual model corresponding to the marked point is the three-dimensional model which does not exist in reality, and parameters such as size, shape and color of the three-dimensional virtual model can be set in advance according to real-time conditions and requirements. In some embodiments, the three-dimensional virtual model may be a three-dimensional arrow model. In this embodiment, the current camera coordinates of the marker point can be determined as the three-dimensional space coordinates of the indication point of the three-dimensional virtual model, where the indication point can be the tip position of the arrow model. The spatial position of the whole three-dimensional virtual model in the camera coordinate system can be determined in real-time by determining the three-dimensional space coordinate of a point in the three-dimensional virtual model in real-time, so that the three-dimensional virtual model can be rendered in real-time according to the presentation way, the three-dimensional virtual model corresponding to the marked point can be accurately marked on the target object when the user observes at any angle, and the accuracy of remote guidance and the guidance efficiency are greatly improved.

In some embodiments, S140 comprises: if the presentation mode is a mode of binocular optical see-through (OST) lens, determining left eye pixel coordinates corresponding to the three-dimensional virtual model in relation to the marked point according to a first transformation relationship between the camera coordinate system and a left eye virtual three-dimensional coordinate system, a second transformation relationship between the left eye virtual three-dimensional coordinate system and a left eye pixel coordinate system, and the current camera coordinates; rendering the three-dimensional virtual model corresponding to the marked point at the left eye pixel coordinates to display a left eye image corresponding to the three-dimensional virtual model in a left eye OST lens; determining right eye pixel coordinates corresponding to the three-dimensional virtual model in relation to the marked point according to a third transformation relationship between the camera coordinate system and a right eye virtual three-dimensional coordinate system, a fourth transformation relationship between the right eye virtual three-dimensional coordinate system and a right eye pixel coordinate system, and the current camera coordinates; and rendering the three-dimensional virtual model corresponding to the marked point at the right eye pixel coordinates to display a right eye image corresponding to the three-dimensional virtual model in a right eye OST lens.

Wherein, the OST lens is an electronic display, which can enable users to see the content displayed on the lens and also to see the real scene behind the lens through the lens. The binocular OST lens can enable the left eye and the right eye of the user to see different rendering images, so that the binocular parallax effect can be manufactured, and the user can see the images of the three-dimensional virtual model.

Figure 3:
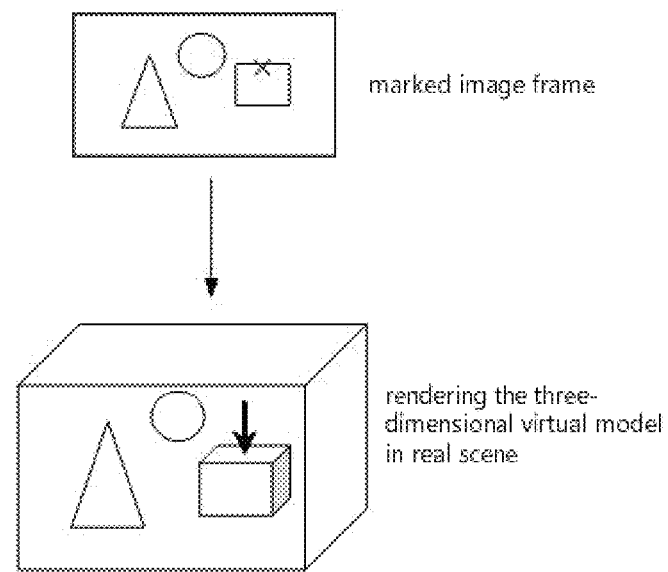
FIG. 3 shows a representation example of a three-dimensional virtual model corresponding to a marked point in a binocular OST lens mode according to Embodiment One of the present disclosure.

According to the see-through characteristic of the OST lens, the user can think that the rendered three-dimensional virtual model actually exists in the target scene. The left eye virtual three-dimensional coordinate system in this embodiment is a virtual three-dimensional coordinate system composed of the human eyes and the left eye OST lenses, the right eye virtual three-dimensional coordinate system is a virtual three-dimensional coordinate system composed of the human eyes and the right eye OST lenses, and the left eye virtual three-dimensional coordinate system is different from the right eye virtual three-dimensional coordinate system. After the camera is fixedly installed on the intelligent glasses, the first transformation relationship between the camera coordinate system and the left eye virtual three-dimensional coordinate system, the second transformation relationship between the left eye virtual three-dimensional coordinate system and the left eye pixel coordinate system, the third transformation relationship between the camera coordinate system and the right eye virtual three-dimensional coordinate system and the fourth transformation relationship between the right eye virtual three-dimensional coordinate system and the right eye pixel coordinate system can be predetermined. According to the current camera coordinate of the marked point, the first transformation relationship and the second transformation relationship, the left eye pixel coordinates corresponding to the three-dimensional virtual model in the left eye pixel coordinate system can be determined, the left eye pixel coordinates are determined as the rendering position, and the three-dimensional virtual model corresponding to the marked point is rendered in the left eye OST lens. According to the current camera coordinate of the marked point, the third transformation relationship and the fourth transformation relationship, the right eye pixel coordinates corresponding to the three-dimensional virtual model in the right eye pixel coordinate system can be determined, the right eye pixel coordinates are determined as the rendering position, and the three-dimensional virtual model corresponding to the marked point is rendered in the right eye OST lens. FIG. 3 gives an example of the presentation of the three-dimensional virtual model corresponding to the marked point in the binocular OST lens mode. As shown in FIG. 3, a ball, a cone and a cuboid are in the real scene, The x in FIG. 3 represents the marked point selected by the remote instructor on the marked image frame, the arrow on the cuboid represents the three-dimensional virtual model corresponding to the marked point, and the tip position of the arrow is the position of the marked point in space, so that the field operator can accurately see the position marked by the remote instructor, which makes the operation more accurate, and the guidance efficiency is improved.

In some embodiments, determining the left eye pixel coordinates corresponding to the three-dimensional virtual model in relation to the marked point according to the first transformation relationship between the camera coordinate system and the left eye virtual three-dimensional coordinate system, the second transformation relationship between the left eye virtual three-dimensional coordinate system and the left eye pixel coordinate system, and the current camera coordinates, comprises: determining left eye virtual three-dimensional coordinates corresponding to the three-dimensional virtual model in relation to the marked point according to the first transformation relationship between the camera coordinate system and the left eye virtual three-dimensional coordinate system, and the current camera coordinates; and determining left eye pixel coordinates corresponding to the three-dimensional virtual model according to the left eye virtual three-dimensional coordinates and the second transformation relationship between the left eye virtual three-dimensional coordinate system and the left eye pixel coordinate system.

Wherein, the camera coordinates of the three-dimensional virtual model in the current camera coordinate system can be determined according to the current camera coordinates and the three-dimensional virtual model corresponding to the marked point, the three-dimensional virtual model in the current camera coordinate system is mapped to the left eye virtual three-dimensional coordinate system according to the first transformation relationship between the camera coordinate system and the left eye virtual three-dimensional coordinate system, and the left eye virtual three-dimensional coordinates corresponding to the three-dimensional virtual model are determined. And the three-dimensional virtual model in the left eye virtual three-dimensional coordinate system is mapped to the left eye pixel coordinate system according to the second transformation relationship between the left eye virtual three-dimensional coordinate system and the left eye pixel coordinate system, and the left eye pixel coordinates corresponding to the three-dimensional virtual model is determined. Similarly, when determining the right eye pixel coordinates corresponding to the three-dimensional virtual model, the right eye virtual three-dimensional coordinate corresponding to the three-dimensional virtual model corresponding to the marked point can be determined according to the third transformation relationship between the camera coordinate system and the right eye virtual three-dimensional coordinate system and the current camera coordinate; and the right eye pixel coordinates corresponding to the three-dimensional virtual model can be determined according to the fourth transformation relationship between the right eye virtual three-dimensional coordinate system and the left eye pixel coordinate system and the right eye virtual three-dimensional coordinate.

In some embodiments, S140 comprises: if the presentation mode is a mode of video see-through (VST) lens, projecting the three-dimensional virtual model corresponding to the marked point to a pixel coordinate system according to the current camera coordinates and a fifth transformation relationship between the pixel coordinate system and the camera coordinate system, and determining pixel coordinates corresponding to the three-dimensional virtual model; and rendering the three-dimensional virtual model into a current image frame of the two-dimensional video according to the pixel coordinates corresponding to the three-dimensional virtual model to display the rendered current image frame in the VST lens.

Figure 4:
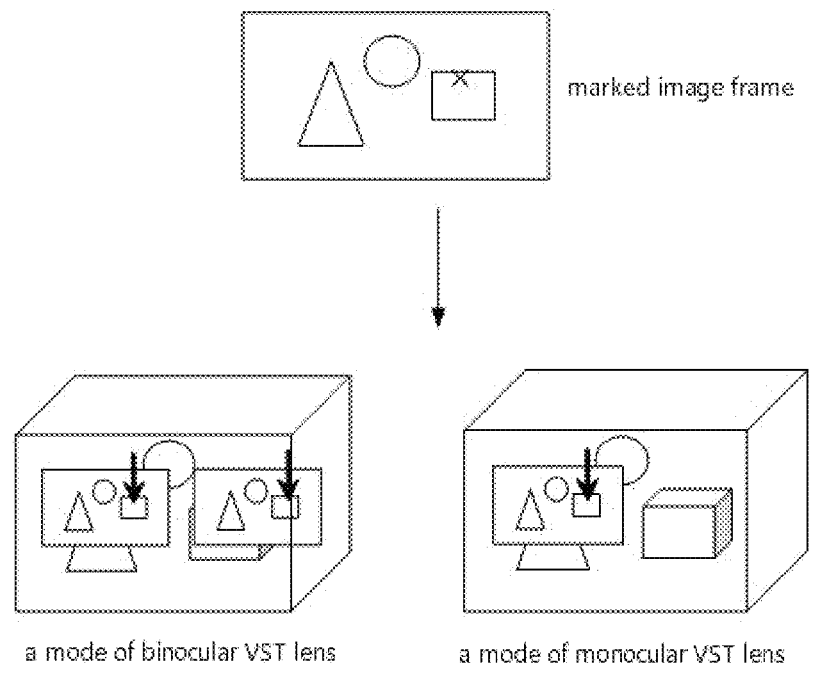
FIG. 4 shows a representation example of a three-dimensional virtual model corresponding to a marked point in a VST lens mode according to Embodiment One of the present disclosure.

Wherein, the pixel coordinate system is the two-dimensional coordinate system corresponding to the image frame captured by the camera. And the camera coordinates of the three-dimensional virtual model in the current camera coordinate system can be determined according to the current camera coordinates and the three-dimensional virtual model corresponding to the marked point. The three-dimensional virtual model is projected to the pixel coordinate system according to the fifth transformation relationship between the pixel coordinate system and the camera coordinate system, so that the pixel coordinates corresponding to the three-dimensional virtual model can be determined. The pixel coordinates corresponding to the three-dimensional virtual model are determined as rendering positions, the three-dimensional virtual model is rendered on the current image frame of the two-dimensional video, the rendered current image frame is displayed in the VST lens. At the moment, the user can only see the image frame with the three-dimensional virtual model, the real scene behind the lens cannot be seen, but the marked point seen by field operators through the VST lens are still three-dimensional. And when the presentation mode is the binocular VST lens mode, displaying the rendered current image frame in both the left eye VST lens and the right eye VST lens according to the pixel coordinates corresponding to the three-dimensional virtual model. When the presentation mode is the monocular VST lens mode, the rendered current image frame is only displayed in the monocular VST lens according to the pixel coordinates corresponding to the three-dimensional virtual model, so that one eye of the user can observe the three-dimensional virtual model, and the other eye of the user can directly observe the real scene through the lens. FIG. 4 gives an example of presentation of the three-dimensional virtual model corresponding to the marked point in the VST lens mode. As shown in FIG. 4, a ball, a cone and a cuboid exist in the real scene, the x in FIG. 4 represents the marked point selected by the remote instructor on the marked image frame, the arrow on the cuboid represents the three-dimensional virtual model corresponding to the marked point, and the tip position of the arrow is the position of the marked point in space. In the binocular VST lens mode, both eyes of the user can see the image frame with the three-dimensional virtual model. In monocular VST lens mode, only one eye of the user can see the image frame with the three-dimensional virtual model.

The technical scheme of the embodiment, the acquired two-dimensional video of the target scene is sent to the remote terminal; when the guidance mode of the remote guidance is the marking mode, acquiring two-dimensional pixel coordinates corresponding to the marked point of the marked image frame of the two-dimensional video at the remote terminal; determining the current camera coordinate corresponding to the marked point according to the first three-dimensional coordinate estimation rules and the two-dimensional pixel coordinates; and rendering the three-dimensional virtual model corresponding to the marked point according to the presentation mode and the current camera coordinate so as to display the three-dimensional virtual model in the target scene. According to the embodiment, only one normal RGB camera can be used for capturing the two-dimensional video, and the depth camera is not required to be added to obtain the depth image, so that the hardware cost is reduced. And the current camera coordinate corresponding to the marked point can be determined in real-time, so that the three-dimensional virtual model corresponding to the marked point can be tracked in real-time and rendered according to the current camera coordinate, and the three-dimensional virtual model corresponding to the marked point can be marked at the accurate position when the operator at the field terminal observes at any angle, which greatly improves the accuracy of and the efficiency of the remote guidance.

In some embodiments, the method further comprises:

If the guidance mode of the remote guidance is text annotation mode, acquiring text information sent by the remote terminal and/or by a data server; and rendering the text information according to the presentation mode to display the text information in the target scene.

Wherein, the text annotation mode is a mode that the remote instructor displays text information to the field operator. Text information may refer to information that is important to the field operator, such as part number, size, inventory, and the like. In addition to connecting with the remote terminal, the field terminal can also be connected with the data server, so that the text information pre-stored in the data server can be directly acquired. The data on the data server can be updated in real-time, so that the field operator can obtain the latest data. When the presentation mode is binocular OST lens mode, the text information is rendered into the left eye OST lens and/or the left eye OST lens, so that the field operator can directly see the text information in the real scene. When the presentation mode is VST lens mode, the text information is rendered into the image frame in the two-dimensional video, so that the text information can be seen by the field operator. Illustratively, after the remote instructor inputs some text information on the remote terminal, the field operator can intuitively see the text and read the text through the AR glasses worn on the field operator. The text information is directly displayed in the observation visual field, so that both hands of field operators can be liberated, the operators can operate more conveniently, and can repeatedly confirm according to the displayed text information, so that the production process can be ensured to be error-free and the like.

In some embodiments, the method further comprises:

If the guidance mode of the remote guidance is audio mode, acquiring scene audio information in the target scene and sending the scene audio information to the remote terminal.

Wherein, the audio mode is an important mode for the remote instructor to communicate with the field operator. The audio capture device may be mounted on the field terminal, such as on AR glasses worn by the field operator. The scene audio information in the target scene where the operator is located can be collected through the audio collection device, and the collected scene audio information is sent to the remote terminal, so that remote instructors can judge and understand the field situation according to the scene audio information. The audio acquisition equipment can also acquire the audio information of the operator and send the audio information of the operator to the remote terminal. The audio receiving equipment can receive the audio information of the remote instructor sent by the remote terminal so that the remote instructor can communicate with the field operator.

Embodiment Two

Figure 5:
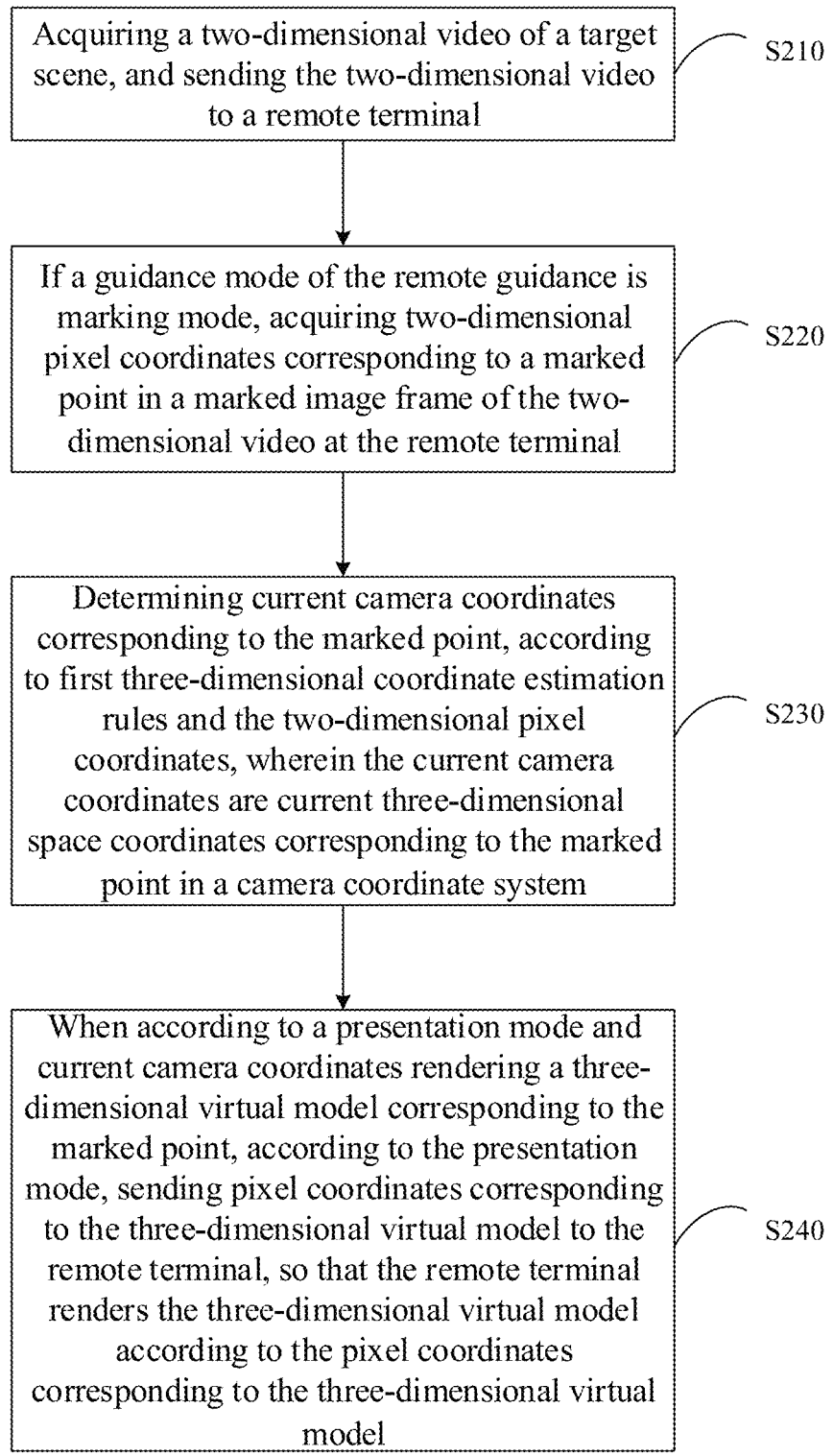
FIG. 5 shows a flowchart of an augmented reality-based remote guidance method according to Embodiment Two of the present disclosure.

FIG. 5 is a flowchart of a remote guidance method based on augmented reality according to Embodiment two of the present disclosure. This embodiment is optimized on the basis of the above-described embodiment: when rendering the three-dimensional virtual model corresponding to the marked point according to the presentation mode and the current camera coordinate, further comprising: according to the presentation mode, sending the pixel coordinates corresponding to the three-dimensional virtual model to the remote terminal so that the remote terminal renders the three-dimensional virtual model according to the pixel coordinates corresponding to the three-dimensional virtual model.

The optimized augmented reality-based remote guidance method comprises the following steps:

S210, acquiring a two-dimensional video of a target scene, and sending the two-dimensional video to a remote terminal.

S220, if a guidance mode of remote guidance is marking mode, acquiring two-dimensional pixel coordinates corresponding to a marked point in a marked image frame of the two-dimensional video at the remote terminal.

S230, determining current camera coordinates corresponding to the marked point according to first three-dimensional coordinate estimation rules and the two-dimensional pixel coordinates, wherein the current camera coordinates are current three-dimensional space coordinates corresponding to the marked point in a camera coordinate system.

S240, when rendering a three-dimensional virtual model corresponding to the marked point according to a presentation mode and current camera coordinates, sending pixel coordinates corresponding to the three-dimensional virtual model to the remote terminal according to the presentation mode; and rendering, by the remote terminal, the three-dimensional virtual model according to the pixel coordinates corresponding to the three-dimensional virtual model.

Wherein, the pixel coordinates corresponding to the three-dimensional virtual model refer to the pixel coordinates corresponding to the three-dimensional virtual model in the pixel coordinate system of the real camera. The pixel coordinates corresponding to the three-dimensional virtual model are sent to the remote terminal in real-time, so that the remote terminal can render according to the pixel coordinates corresponding to the three-dimensional virtual model, so that the remote instructor can also see the marked position on the display interface of the remote terminal, therefore, it can be confirm whether the marked position is accurate in real-time, in order to avoid the guidance error, so as to improve the efficiency of guidance.

In some embodiments, S240 comprises: if the presentation mode is a mode of binocular optical see-through (OST) lens, determining pixel coordinates corresponding to the three-dimensional virtual model according to the current camera coordinates and the fifth transformation relationship between the pixel coordinate system and the camera coordinate system, and sending the pixel coordinates corresponding to the three-dimensional virtual model to the remote terminal.

Wherein, when the presentation mode is binocular OST lens mode, because the three-dimensional virtual model corresponding to the marked point is rendered in the OST lens, the rendering is based on the left eye pixel coordinate corresponding to the three-dimensional virtual model and the right eye pixel coordinate corresponding to the three-dimensional virtual model, and the rendering is not based on the pixel coordinate corresponding to the three-dimensional virtual model, the pixel coordinate corresponding to the three-dimensional virtual model needs to be further determined in the binocular OST lens mode. The three-dimensional virtual model in the camera coordinate system is converted into the pixel coordinate system according to the fifth transformation relationship between the pixel coordinate system and the camera coordinate system, so that the pixel coordinate corresponding to the three-dimensional virtual model is determined.

In some embodiments, S240 comprises: if the presentation mode is a mode of video see-through (VST) lens, sending the pixel coordinates corresponding to the three-dimensional virtual model to the remote terminal.

Wherein, when the presentation mode is VST lens mode, because the three-dimensional virtual model corresponding to the marked point is rendered in the VST lens, the rending is based on the pixel coordinates corresponding to the three-dimensional virtual model, and therefore the pixel coordinate corresponding to the three-dimensional virtual model can be directly sent to the remote terminal.

In some embodiments, rendering, by the remote terminal, the three-dimensional virtual model according to the pixel coordinates corresponding to the three-dimensional virtual model, comprises: rendering, by the remote terminal, the three-dimensional virtual model into the current image frame of the two-dimensional video according to the pixel coordinates corresponding to the three-dimensional virtual model to display the rendered current image frame in the remote terminal.

Figure 6:
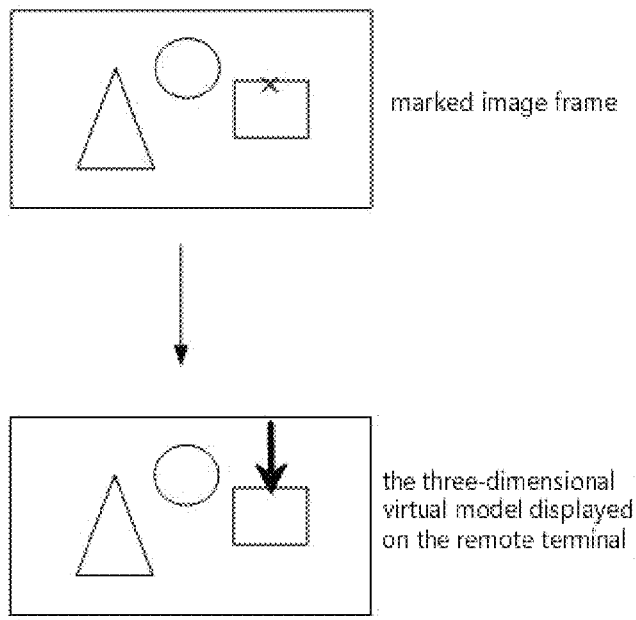
FIG. 6 shows a representation of a three-dimensional virtual model on the remote terminal according to Embodiment Two of the present disclosure.

Wherein, the remote terminal can determine pixel coordinates corresponding to the three-dimensional virtual model as rendering coordinates, and render the three-dimensional virtual model into the current image frame in the received two-dimensional video, so that the remote instructor can watch the image frame with the three-dimensional virtual model on the display interface of the remote terminal in real-time, and the display effect of the image frame with the three-dimensional virtual model is similar to that of a VST lens. The marked point seen by the remote instructor are also three-dimensional. FIG. 6 shows an example of the presentation of a three-dimensional virtual model on the remote terminal. As shown in FIG. 6, the remote instructor may select a point on the marked image frame by clicking, namely, the x on the rectangle represents the marked point, and the three-dimensional virtual model corresponding to the marked point is an arrow model. The tip position of the rendered arrow model is the position of the marked point x, so that the remote instructor can determine whether the marked point viewed by the field operator is an accurate marked point in real-time.

The technical scheme of the embodiment, the pixel coordinates corresponding to the three-dimensional virtual model are sent to the remote terminal according to the presentation mode, the remote terminal can render according to the pixel coordinates corresponding to the three-dimensional virtual model, so that the remote instructor can see the marked position on the display interface of the remote terminal, therefore, it can confirm whether the marked position is accurate in real time to avoid instruction errors, and the efficiency of instruction is improved.

Embodiment Three

Figure 7:
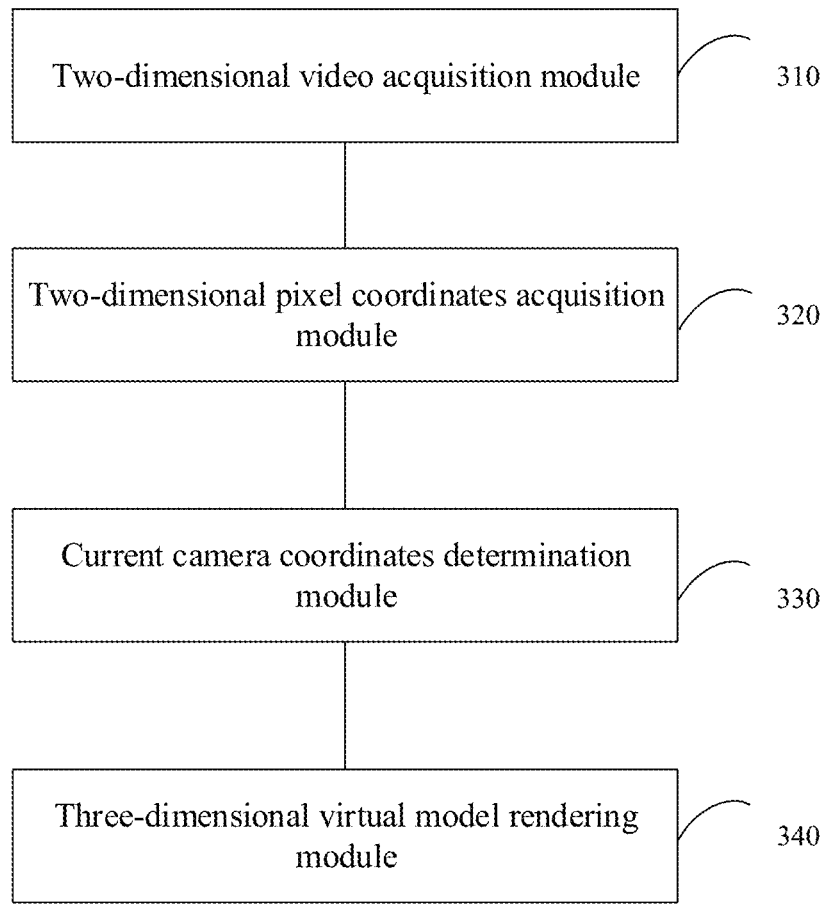
FIG. 7 shows a structure diagram of an augmented reality-based remote guidance apparatus according to Embodiment Three of the present disclosure.

FIG. 7 is structural diagram of a remote guidance apparatus based on augmented reality according to Embodiment three of the present disclosure, which is applicable to the situation of tracking in real-time and rendering the three-dimensional virtual model corresponding to the marked point in a two-dimensional video at a remote terminal. The apparatus comprises: the two-dimensional video acquisition module 310, the two-dimensional pixel coordinate acquisition module 320, the current camera coordinate determination module 330, and the three-dimensional virtual model rendering module 340.

Wherein, the two-dimensional video acquisition module 310 is configured to acquiring a two-dimensional video of a target scene, and sending the two-dimensional video to a remote terminal; the two-dimensional pixel coordinate acquiring module 320 is configured to acquiring two-dimensional pixel coordinates corresponding to a marked point in a marked image frame of the two-dimensional video at the remote terminal, if the guidance mode of remote guidance is marking mode; the current camera coordinate determination module 330 is configured to determining current camera coordinates corresponding to the marked point according to first three-dimensional coordinate estimation rules and the two-dimensional pixel coordinates, wherein the current camera coordinates are current three-dimensional space coordinates corresponding to the marked point in a camera coordinate system; and the three-dimensional virtual model rendering module 340 is configured to rendering a three-dimensional virtual model corresponding to the marked point according to a presentation mode and the current camera coordinates to display the three-dimensional virtual model in the target scene.

In some embodiments, the current camera coordinate determination module 330, comprising:

The world coordinate determination unit is used for determining world coordinates corresponding to the marked point according to second three-dimensional estimation rules, a preset reconstruction algorithm and the two-dimensional pixel coordinates, wherein the world coordinates refer to the world three-dimensional space coordinates corresponding to the marked point in a world coordinate system;

The current camera pose determination unit is used for determining a current camera pose according to the preset reconstruction algorithm and the two-dimensional video;

The current camera coordinates determination unit is used for determining current camera coordinates corresponding to the marked point according to the world coordinates and the current camera pose.

In some embodiments, the three-dimensional virtual model rendering module 340 comprises:

The left eye pixel coordinates determination unit is used for determining left eye pixel coordinates corresponding to the three-dimensional virtual model in relation to the marked point according to a first transformation relationship between the camera coordinate system and a left eye virtual three-dimensional coordinate system, a second transformation relationship between the left eye virtual three-dimensional coordinate system and a left eye pixel coordinate system, and the current camera coordinates, if the presentation mode is a mode of binocular optical see-through (OST) lens;

The left eye rendering unit is used for rendering the three-dimensional virtual model corresponding to the marked point at the left eye pixel coordinates to display a left eye image corresponding to the three-dimensional virtual model in a left eye OST lens;

The right eye pixel coordinate determination unit is used for determining right eye pixel coordinates corresponding to the three-dimensional virtual model in relation to the marked point according to a third transformation relationship between the camera coordinate system and a right eye virtual three-dimensional coordinate system, a fourth transformation relationship between the right eye virtual three-dimensional coordinate system and a right eye pixel coordinate system, and the current camera coordinates;

The right eye rendering unit is used for rendering the three-dimensional virtual model corresponding to the marked point at the right eye pixel coordinates to display a right eye image corresponding to the three-dimensional virtual model in a right eye OST lens.

In some embodiments, the left eye pixel coordinate determination unit is used for: determining left eye virtual three-dimensional coordinates corresponding to the three-dimensional virtual model in relation to the marked point according to the first transformation relationship between the camera coordinate system and the left eye virtual three-dimensional coordinate system, and the current camera coordinates; and determining the left eye pixel coordinate corresponding to the three-dimensional virtual model according to the left eye virtual three-dimensional coordinates and the second transformation relationship between the left eye virtual three-dimensional coordinate system and the left eye pixel coordinate system.

In some embodiments, the three-dimensional virtual model rendering module 340 further comprises:

The pixel coordinate determination unit is used for projecting the three-dimensional virtual model corresponding to the marked point to a pixel coordinate system according to the current camera coordinates and a fifth transformation relationship between the pixel coordinate system and the camera coordinate system, and determining pixel coordinates corresponding to the three-dimensional virtual model, if the presentation mode is a mode of video see-through (VST) lens;

The image rendering unit is used for rendering the three-dimensional virtual model into a current image frame of the two-dimensional video according to the pixel coordinates corresponding to the three-dimensional virtual model to display the rendered current image frame in the VST lens.

In some embodiments, the apparatus further comprises:

The pixel coordinate sending module is used for when rendering the three-dimensional virtual model corresponding to the marked point according to the presentation mode and the current camera coordinates, sending pixel coordinates corresponding to the three-dimensional virtual model to the remote terminal according to the presentation mode, and rendering, by the remote terminal, the three-dimensional virtual model according to the pixel coordinates corresponding to the three-dimensional virtual model.

In some embodiments, the pixel coordinate sending module is used for:

Determining pixel coordinates corresponding to the three-dimensional virtual model according to the current camera coordinates and the fifth transformation relationship between the pixel coordinate system and the camera coordinate system, and sending the pixel coordinates corresponding to the three-dimensional virtual model to the remote terminal, if the presentation mode is a mode of binocular optical see-through (OST) lens.

In some embodiments, the pixel coordinate sending module is used for:

Sending the pixel coordinates corresponding to the three-dimensional virtual model to the remote terminal, if the presentation mode is a mode of video see-through (VST) lens.

In some embodiments, the remote terminal further comprises:

The remote terminal rendering module is used for rendering, by the remote terminal, the three-dimensional virtual model into the current image frame of the two-dimensional video according to the pixel coordinates corresponding to the three-dimensional virtual model to display the rendered current image frame in the remote terminal.

In some embodiments, the method further comprises:

If the guidance mode of the remote guidance is text annotation mode, acquiring text information sent by the remote terminal and/or by a data server; and rendering the text information according to the presentation mode to display the text information in the target scene.

In some embodiments, the method further comprises:

If the guidance mode of the remote guidance is audio mode, acquiring scene audio information in the target scene, and sending the scene audio information to the remote terminal.

In some embodiments, the world coordinate determination unit comprises:

The first mapping straight line determination subunit is used for determining first mapping straight line corresponding to the two-dimensional pixel coordinates in the camera coordinate system according to the fifth transformation relationship between the pixel coordinate system and the camera coordinate system;

The target camera point determination subunit is used for determining a target camera point in the camera coordinate system according to a sixth transformation relationship between the world coordinate system and the camera coordinate system, preset filtering rules, and a three-dimensional world point cloud in the world coordinate system, wherein the three-dimensional world point cloud and the sixth transformation relationship are determined according to the two-dimensional video and the preset reconstruction algorithm;

The camera coordinate determination subunit is used for determining camera coordinates corresponding to the marked point in the camera coordinate system according to third estimation rules corresponding to the preset filtering rules, the first mapping straight line and the target camera point;

The world coordinate determination subunit is used for determining world coordinates corresponding to the marked point in the world coordinate system according to the sixth transformation relationship and the camera coordinates.

In some embodiments, the target camera point determination subunit comprises:

Determining a three-dimensional camera point cloud in the camera coordinate system according to the sixth transformation relationship between the world coordinate system and the camera coordinate system, and further according to the three-dimensional world point cloud in the world coordinate system; and determining the target camera point in the camera coordinate system according to the preset filtering rules, the three-dimensional camera point cloud and the first mapping straight line corresponding to the two-dimensional pixel coordinates.

In some embodiments, the target camera point determination subunit comprises:

Mapping the two-dimensional pixel coordinates into the three-dimensional world point cloud in the world coordinate system, and determining a second mapping straight line corresponding to the two-dimensional pixel coordinates in the world coordinate system; determining a target world point in the three-dimensional world point cloud according to the preset filtering rules and the second mapping straight line; and determining the target camera point in the camera coordinate system according to the sixth transformation relationship between the world coordinate system and the camera coordinate system, and further according to the target world point.

In some embodiments, the target camera point determination subunit comprises:

Determining the three-dimensional camera point cloud in the camera coordinate system according to the three-dimensional world point cloud in the world coordinate system, and the sixth transformation relationship between the world coordinate system and the camera coordinate system; determining a two-dimensional pixel point cloud in the pixel coordinate system according to the three-dimensional camera point cloud, and the fifth transformation relationship between the pixel coordinate system and the camera coordinate system, and recording the mapping between a three-dimensional camera point and a two-dimensional pixel point; determining a target pixel point in the two-dimensional pixel point cloud according to the preset filtering rules, the two-dimensional pixel point cloud and the two-dimensional pixel coordinates; and determining the target camera point in the camera coordinate system according to the mapping and the target pixel point.

In some embodiments, the preset reconstruction algorithm comprises: SLAM algorithm based on ORB feature points; correspondingly, the apparatus further comprises: the three-dimensional world point cloud determination module for: extracting ORB feature points of the current image frame and the ORB feature points of the previous image frame from the two-dimensional video; and matching the ORB feature points of the current image frame with the ORB feature points of the previous image frame, and creating the three-dimensional world point cloud of the ORB feature points according to parallax principle.

In some embodiments, the apparatus further comprises: the sixth transformation relationship determination module is used for: determining a marked camera pose corresponding to the marked image frame according to the ORB feature points in the marked image frame and the ORB feature points in the previous image frame of the marked image frame, and taking the marked camera pose as the sixth transformation relationship.

In some embodiments, the preset reconstruction algorithm comprises: SLAM algorithm based on ORB feature points; correspondingly, the current camera pose determination unit is used for: determining the current camera pose according to the ORB feature points in the current image frame of the two-dimensional video and the ORB feature points in the previous image frame of the current image frame.

The remote guidance apparatus based on augmented reality can execute the remote guidance method based on augmented reality provided by any embodiment of the disclosure, and has corresponding functional modules and beneficial effects for executing the remote guidance method based on augmented reality.

Embodiment Four

Figure 8:
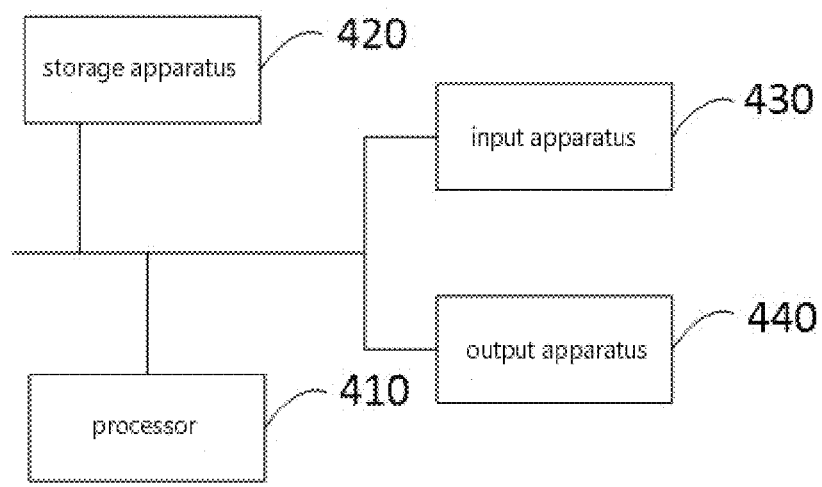
FIG. 8 shows a structure diagram of a terminal according to Embodiment Four of the present disclosure.

FIG. 8 is a structural diagram of a terminal according to Embodiment four of the present disclosure. Referring to FIG. 8, the terminal comprises:

One or more processors 410;

A storage apparatus 420 for storing one or more programs;

An input apparatus 430 for acquiring a two-dimensional video;

An output apparatus 440, for displaying a three-dimensional virtual model corresponding to a marked point;

While the one or more programs are executed by the one or more processors 410, configures the one or more processors 410 implement the augmented reality based remote guidance method according to any one of the embodiments above.

In FIG. 8, a processor 410 is illustrated as an example; the processor 410, the storage apparatus 420, the input apparatus 430 and the output apparatus 440 in the terminal may be connected by the bus or other means, and the connection by the bus is exemplified in FIG. 8.

The storage apparatus 420, which is a computer-readable storage medium, may be used to store software programs, computer-executable programs, and modules, such as program instructions/modules corresponding to the augmented reality-based remote guidance method in embodiments of the present disclosure (e.g., two-dimensional video acquisition module 310, two-dimensional pixel coordinate acquisition module 320, current camera coordinate determination module 330, and three-dimensional virtual model rendering module 340). The processor 410 executes various functional applications of the terminal and data processing by executing software programs, instructions, and modules stored in the storage apparatus 420, that is, implements the augmented reality-based remote guidance method described above.

The storage apparatus 420 mainly includes a program storage area and a data storage area, wherein the program storage area can store an operating system and an application program required by at least one function; the data storage area may store data created according to the use of the terminal, and the like. Further, the storage apparatus 420 may include high-speed random access memory, and may also include non-volatile memory, such as at least one magnetic disk storage device, flash memory device, or other non-volatile solid state storage device. In some examples, the storage apparatus 420 can further include memory located remotely from the processor 410, which can be connected to the terminal over a network. Examples of such networks include, but are not limited to, the internet, intranets, local area networks, mobile communication networks, and combinations thereof.

The input apparatus 430 may include the camera or other capturing apparatus, and is used to acquire the two-dimensional video and input the acquired two-dimensional video to the processor 410 for data processing.

The output apparatus 440 may include the display screen, the lens, etc. for displaying the three-dimensional virtual model corresponding to the marked point.

The terminal proposed in this embodiment and the augmented reality-based remote guidance method proposed in the above embodiments belong to the same inventive concept. Technical details not described in detail in this embodiment can be seen in the above embodiments, this embodiment has the same beneficial effect of executing the remote guidance method based on augmented reality.

Embodiment Five

The fifth embodiment provides a non-transitory computer-readable storage medium, including computer code, which, when being executed by a processor, performs the augmented reality based remote guidance method according to any embodiment of the disclosure.

Computer storage media for embodiments of the present disclosure may take the form of any combination of one or more computer-readable media. The computer readable medium may be the computer readable signal medium or the computer readable storage medium. The computer-readable storage medium may be, for example but not limited to: electronic, magnetic, optical, electromagnetic, infrared, or semiconductor system, apparatus, or device, or any combination of the foregoing. More examples (a non-exhaustive list) of the computer readable storage medium would include the following: electrical connection having one or more wires, portable computer diskette, hard disk, Random Access Memory (RAM), read-only memory (ROM), erasable programmable read-only memory (EPROM or flash memory), optical fiber, portable compact disc read-only memory (CD-ROM), optical storage device, magnetic storage device, or any suitable combination of the foregoing. In the context of this document, the computer readable storage medium may be any tangible medium containing or storing program, the program can be used or combined with instruction execution system, apparatus or device.

The computer readable signal medium may include data signals transmitted in baseband or as part of carrier wave, which carries the computer readable program code. This kind of data signal can take many forms, including, but not limited to, electro-magnetic, optical, or any suitable combination of the above. The computer readable signal medium may be any computer readable medium other than the computer readable storage medium, and the computer readable medium can send, propagate, or transmit the program used by or in combination with instruction execution system, apparatus, or device.

The program code embodied on the computer readable medium may be transmitted using any appropriate medium, including but not limited to: wireless, wire, fiber optic cable, RF, etc., or any suitable combination of the foregoing.

The Computer program code for performing the operation of the present disclosure can be written in one or more programming languages or their combination, the programming language includes the object-oriented programming language such as Java, Smalltalk, C++, also includes the conventional procedural programming language, such as the "C" programming language or the similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including Local Area Network (LAN) or Wide Area Network (WAN), or may be connected to external computer (for example, through the Internet connection using the Internet service provider).

The above embodiment numbers are merely for description and do not represent the merits of the embodiments.

It will be understood by ordinary technical personnel in the field that the modules or steps of the present disclosure described above can be implemented by the general computing apparatus, they can be centralized in a single computing apparatus or distributed over a network of multiple computing apparatus, In some embodiments, they can be implemented by program code executable by the computing apparatus, so that they can be stored in the storage apparatus and executed by the computing apparatus, or they can be separately fabricated into various integrated circuit modules, or multiple modules or steps thereof can be fabricated into a single integrated circuit module. Thus, the present disclosure is not limited to any specific combination of hardware and software.

Each embodiment in the present specification is described in a progressive manner, and each embodiment focuses on differences from other embodiments, and the same or similar parts between the embodiments are referred to each other.

It is to be noted that the above is only a better embodiment of the disclosure and the applied technical principle. Technical personnel in the field will understand that the present disclosure is not limited to the particular embodiments described herein, and that various obvious changes, rearrangements and substitutions will now be apparent to technical personnel in the field without departing from the scope of the disclosure. Therefore, although the present disclosure has been described in detail by the above embodiments, however the disclosure is not limited to the above embodiments, and may include more other equivalent embodiments without departing from the concept of the disclosure, and the scope of the disclosure is determined by the scope of the appended claims.

What is claimed is:

1. An augmented reality-based remote guidance method, comprising:
   acquiring a two-dimensional video of a target scene, and sending the two-dimensional video to a remote terminal;
   if a guidance mode of remote guidance is marking mode, acquiring two-dimensional pixel coordinates corresponding to a marked point in a marked image frame of the two-dimensional video at the remote terminal;

determining current camera coordinates corresponding to the marked point according to first three-dimensional coordinate estimation rules and the two-dimensional pixel coordinates, wherein the current camera coordinates are current three-dimensional space coordinates corresponding to the marked point in a camera coordinate system; and rendering a three-dimensional virtual model corresponding to the marked point according to a presentation mode and the current camera coordinates to display the three-dimensional virtual model in the target scene;

wherein the determining the current camera coordinates corresponding to the marked point according to the first three-dimensional coordinate estimation rules and the two-dimensional pixel coordinates, comprises:

determining world coordinates corresponding to the marked point according to second three-dimensional estimation rules, a preset reconstruction algorithm and the two-dimensional pixel coordinates, wherein the world coordinates refer to world three-dimensional space coordinates corresponding to the marked point in a world coordinate system;

determining a current camera pose according to the preset reconstruction algorithm and the two-dimensional video; and determining current camera coordinates corresponding to the marked point according to the world coordinates and the current camera pose;

wherein the determining the world coordinates corresponding to the marked point according to the second three-dimensional estimation rules, the preset reconstruction algorithm and the two-dimensional pixel coordinates, comprises:

determining first mapping straight line corresponding to the two-dimensional pixel coordinates in the camera coordinate system according to the fifth transformation relationship between the pixel coordinate system and the camera coordinate system;

determining a target camera point in the camera coordinate system according to a sixth transformation relationship between the world coordinate system and the camera coordinate system, preset filtering rules, and a three-dimensional world point cloud in the world coordinate system, wherein the three-dimensional world point cloud and the sixth transformation relationship are determined according to the two-dimensional video and the preset reconstruction algorithm;

determining camera coordinates corresponding to the marked point in the camera coordinate system according to third estimation rules corresponding to the preset filtering rules, the first mapping straight line and the target camera point; and determining world coordinates corresponding to the marked point in the world coordinate system according to the sixth transformation relationship and the camera coordinates.

2. The method according to claim 1, wherein the rendering the three-dimensional virtual model corresponding to the marked point according to the presentation mode and the current camera coordinates to display the three-dimensional virtual model in the target scene, comprises:

if the presentation mode is a mode of binocular optical see-through (OST) lens, determining left eye pixel coordinates corresponding to the three-dimensional virtual model in relation to the marked point according to a first transformation relationship between the camera coordinate system and a left eye virtual three-dimensional coordinate system, a second transformation relationship between the left eye virtual three-dimensional coordinate system and a left eye pixel coordinate system, and the current camera coordinates;

rendering the three-dimensional virtual model corresponding to the marked point at the left eye pixel coordinates to display a left eye image corresponding to the three-dimensional virtual model in a left eye OST lens;

determining right eye pixel coordinates corresponding to the three-dimensional virtual model in relation to the marked point according to a third transformation relationship between the camera coordinate system and a right eye virtual three-dimensional coordinate system, a fourth transformation relationship between the right eye virtual three-dimensional coordinate system and a right eye pixel coordinate system, and the current camera coordinates; and rendering the three-dimensional virtual model corresponding to the marked point at the right eye pixel coordinates to display a right eye image corresponding to the three-dimensional virtual model in a right eye OST lens.

3. The method according to claim 2, wherein the determining the left eye pixel coordinates corresponding to the three-dimensional virtual model in relation to the marked point according to the first transformation relationship between the camera coordinate system and the left eye virtual three-dimensional coordinate system, the second transformation relationship between the left eye virtual three-dimensional coordinate system and the left eye pixel coordinate system, and the current camera coordinates, comprises:

determining left eye virtual three-dimensional coordinates corresponding to the three-dimensional virtual model in relation to the marked point according to the first transformation relationship between the camera coordinate system and the left eye virtual three-dimensional coordinate system, and the current camera coordinates; and determining left eye pixel coordinates corresponding to the three-dimensional virtual model according to the left eye virtual three-dimensional coordinates and the second transformation relationship between the left eye virtual three-dimensional coordinate system and the left eye pixel coordinate system.

4. The method according to claim 1, wherein the rendering the three-dimensional virtual model corresponding to the marked point according to the presentation mode and the current camera coordinates to display the three-dimensional virtual model in the target scene, comprises:

if the presentation mode is a mode of video see-through (VST) lens, projecting the three-dimensional virtual model corresponding to the marked point to a pixel coordinate system according to the current camera coordinates and a fifth transformation relationship between the pixel coordinate system and the camera coordinate system, and determining pixel coordinates corresponding to the three-dimensional virtual model; and rendering the three-dimensional virtual model into a current image frame of the two-dimensional video according to the pixel coordinates corresponding to the three-dimensional virtual model to display the rendered current image frame in the VST lens.

5. The method according to claim 1, wherein the rendering the three-dimensional virtual model corresponding to the marked point according to the presentation mode and the current camera coordinates, comprises:
    sending pixel coordinates corresponding to the three-dimensional virtual model to the remote terminal according to the presentation mode; and
    rendering, by the remote terminal, the three-dimensional virtual model according to the pixel coordinates corresponding to the three-dimensional virtual model.

6. The method according to claim 5, wherein the sending the pixel coordinates corresponding to the three-dimensional virtual model to the remote terminal according to the presentation mode, comprises:
    if the presentation mode is a mode of binocular optical see-through (OST) lens, determining pixel coordinates corresponding to the three-dimensional virtual model according to the current camera coordinates and the fifth transformation relationship between the pixel coordinate system and the camera coordinate system, and sending the pixel coordinates corresponding to the three-dimensional virtual model to the remote terminal.

7. The method according to claim 5, wherein the sending the pixel coordinates corresponding to the three-dimensional virtual model to the remote terminal according to the presentation mode, comprises:
    if the presentation mode is a mode of video see-through (VST) lens, sending the pixel coordinates corresponding to the three-dimensional virtual model to the remote terminal.

8. The method according to claim 5, wherein the rendering, by the remote terminal, the three-dimensional virtual model according to the pixel coordinates, comprises:
    rendering, by the remote terminal, the three-dimensional virtual model into the current image frame of the two-dimensional video according to the pixel coordinates corresponding to the three-dimensional virtual model to display the rendered current image frame in the remote terminal.

9. The method according to claim 1, further comprising:
    if the guidance mode of the remote guidance is text annotation mode, acquiring text information sent by the remote terminal and/or by a data server; and
    rendering the text information according to the presentation mode to display the text information in the target scene.

10. The method according to claim 1, further comprising:
    if the guidance mode of the remote guidance is audio mode, acquiring scene audio information in the target scene, and sending the scene audio information to the remote terminal.

11. The method according to claim 1, wherein the determining the target camera point in the camera coordinate system according to the sixth transformation relationship between the world coordinate system and the camera coordinate system, the preset filtering rules, and the three-dimensional world point cloud in the world coordinate system, comprises:
    determining a three-dimensional camera point cloud in the camera coordinate system according to the sixth transformation relationship between the world coordinate system and the camera coordinate system, and further according to the three-dimensional world point cloud in the world coordinate system; and
    determining the target camera point in the camera coordinate system according to the preset filtering rules, the three-dimensional camera point cloud and the first mapping straight line corresponding to the two-dimensional pixel coordinates.

12. The method according to claim 1, wherein the determining the target camera point in the camera coordinate system according to the sixth transformation relationship between the world coordinate system and the camera coordinate system, the preset filtering rules, and the three-dimensional world point cloud in the world coordinate system, comprises:
    mapping the two-dimensional pixel coordinates into the three-dimensional world point cloud in the world coordinate system, and determining a second mapping straight line corresponding to the two-dimensional pixel coordinates in the world coordinate system;
    determining a target world point in the three-dimensional world point cloud according to the preset filtering rules and the second mapping straight line; and
    determining the target camera point in the camera coordinate system according to the sixth transformation relationship between the world coordinate system and the camera coordinate system, and further according to the target world point.

13. The method according to claim 1, wherein the determining the target camera point in the camera coordinate system according to the sixth transformation relationship between the world coordinate system and the camera coordinate system, the preset filtering rules, and the three-dimensional world point cloud in the world coordinate system, comprises:
    determining the three-dimensional camera point cloud in the camera coordinate system according to the three-dimensional world point cloud in the world coordinate system, and the sixth transformation relationship between the world coordinate system and the camera coordinate system;
    determining a two-dimensional pixel point cloud in the pixel coordinate system according to the three-dimensional camera point cloud, and the fifth transformation relationship between the pixel coordinate system and the camera coordinate system, and recording the mapping between a three-dimensional camera point and a two-dimensional pixel point;
    determining a target pixel point in the two-dimensional pixel point cloud according to the preset filtering rules, the two-dimensional pixel point cloud and the two-dimensional pixel coordinates; and
    determining the target camera point in the camera coordinate system according to the mapping and the target pixel point.

14. The method according to claim 1, wherein, the preset reconstruction algorithm comprises SLAM algorithm based on ORB feature points;
    wherein the three-dimensional world point cloud is determined according to the two-dimensional video and the preset reconstruction algorithm, comprises:
    extracting ORB feature points of the current image frame and the ORB feature points of the previous image frame from the two-dimensional video; and
    matching the ORB feature points of the current image frame with the ORB feature points of the previous image frame, and creating the three-dimensional world point cloud of the ORB feature points according to parallax principle.

15. The method according to claim 14, wherein the sixth transformation relationship is determined according to the two-dimensional video and the preset reconstruction algorithm, comprises:
  determining a marked camera pose corresponding to the marked image frame according to the ORB feature points in the marked image frame and the ORB feature points in the previous image frame of the marked image frame, and taking the marked camera pose as the sixth transformation relationship.

16. The method according to claim 1, wherein, the preset reconstruction algorithm comprises SLAM algorithm based on ORB feature points;
  wherein the determining the current camera pose according to the preset reconstruction algorithm and the two-dimensional video, comprises:
  determining the current camera pose according to the ORB feature points in the current image frame of the two-dimensional video and the ORB feature points in the previous image frame of the current image frame.

17. A terminal, comprises:
one or more processors;
a storage apparatus for storing one or more programs;
an input apparatus for acquiring a two-dimensional video;
an output apparatus for displaying a three-dimensional virtual model corresponding to a marked point;
while the one or more programs are executed by the one or more processors, the one or more processors are configured to implement the augmented reality-based remote guidance method according to claim 1.

18. A non-transitory computer-readable storage medium, including computer programs, which, when being executed by a processor, performs the augmented reality-based remote guidance method according to claim 1.

* * * * *